（12）United States Patent
Honig

(10) Patent No.: US 10,660,727 B2
(45) Date of Patent: May 26, 2020

(54) PARALLEL ALIGNMENT APPARATUS FOR FACILITATING PROSTHODONTIC RESTORATIONS AND METHOD OF USE

(71) Applicant: Iulian Honig, Bucharest (RO)

(72) Inventor: Iulian Honig, Bucharest (RO)

(73) Assignee: ABRACADABRA IMPLANTS LTD, Bat Yam (IL)

( * ) Notice: Subject to any disclaimer, the term of this patent is extended or adjusted under 35 U.S.C. 154(b) by 0 days.

(21) Appl. No.: 14/760,477

(22) PCT Filed: Jan. 14, 2014

(86) PCT No.: PCT/IL2014/050046
§ 371 (c)(1),
(2) Date: Jul. 12, 2015

(87) PCT Pub. No.: WO2014/108908
PCT Pub. Date: Jul. 17, 2014

(65) Prior Publication Data
US 2015/0351865 A1    Dec. 10, 2015

Related U.S. Application Data

(60) Provisional application No. 61/752,219, filed on Jan. 14, 2013.

(51) Int. Cl.
*A61C 19/055* (2006.01)
*A61C 1/08* (2006.01)
*A61C 8/00* (2006.01)

(52) U.S. Cl.
CPC .......... *A61C 1/084* (2013.01); *A61C 8/0053* (2013.01); *A61C 8/0081* (2013.01); *A61C 8/0089* (2013.01); *A61C 19/055* (2013.01); *A61C 8/006* (2013.01); *A61C 8/0068* (2013.01); *A61C 8/0069* (2013.01)

(58) Field of Classification Search
CPC .......... A61C 1/084; A61C 1/082; A61C 1/08; A61C 8/0053; A61C 8/0081; A61C 8/0089; A61C 8/006; A61C 8/0068; A61C 8/0069; A61C 19/055; A61C 19/04; B23Q 3/005; B23Q 3/007; B23Q 3/061; B23Q 7/1421
USPC .......... 433/72, 75, 76, 173, 174; 606/96–98, 606/86 R, 90, 99; 269/37–45, 54
See application file for complete search history.

(56) References Cited

U.S. PATENT DOCUMENTS

| 1,125,576 | A | * | 1/1915 | Maier | A61C 19/04 433/72 |
| 4,253,649 | A | * | 3/1981 | Hewson | B25B 1/22 269/45 |
| 4,708,330 | A | * | 11/1987 | Ehl | B23K 37/0531 269/43 |
| 5,228,181 | A | * | 7/1993 | Ingle | B25B 27/16 228/44.5 |
| 5,741,133 | A | * | 4/1998 | Gordils | A61C 19/055 433/76 |
| 5,888,065 | A | * | 3/1999 | Sussman | A61C 1/084 433/76 |

(Continued)

*Primary Examiner* — Heidi M Eide
(74) *Attorney, Agent, or Firm* — The Law Office of Joseph L. Felber

(57) ABSTRACT

A dental alignment apparatus for aligning and positioning one or more prosthodontic restoration member relative to at least one reference prosthodontic restoration member disposed on the same jaw.

14 Claims, 14 Drawing Sheets

(56) References Cited

U.S. PATENT DOCUMENTS

| | | | | | |
|---|---|---|---|---|---|
| 5,924,862 | A | * | 7/1999 | White | A61C 19/04 |
| | | | | | 33/513 |
| 6,926,525 | B1 | * | 8/2005 | Rønvig | A61C 1/084 |
| | | | | | 433/76 |
| 8,197,514 | B2 | * | 6/2012 | Maas | A61B 17/7065 |
| | | | | | 606/248 |
| 8,894,655 | B2 | * | 11/2014 | Fallin | A61B 17/7085 |
| | | | | | 606/264 |
| 8,910,927 | B2 | * | 12/2014 | Lee | B25B 5/003 |
| | | | | | 248/181.1 |
| 2002/0029822 | A1 | * | 3/2002 | Jukoff | B23D 47/04 |
| | | | | | 144/253.6 |
| 2004/0099111 | A1 | * | 5/2004 | Adkins | B23Q 1/012 |
| | | | | | 83/98 |
| 2012/0193855 | A1 | * | 8/2012 | Takahashi | B25B 5/122 |
| | | | | | 269/32 |
| 2014/0154638 | A1 | * | 6/2014 | Kats | A61C 9/0006 |
| | | | | | 433/49 |

* cited by examiner

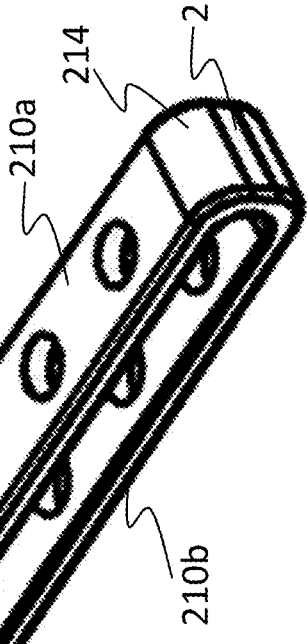
FIG. 3E
FIG. 3A

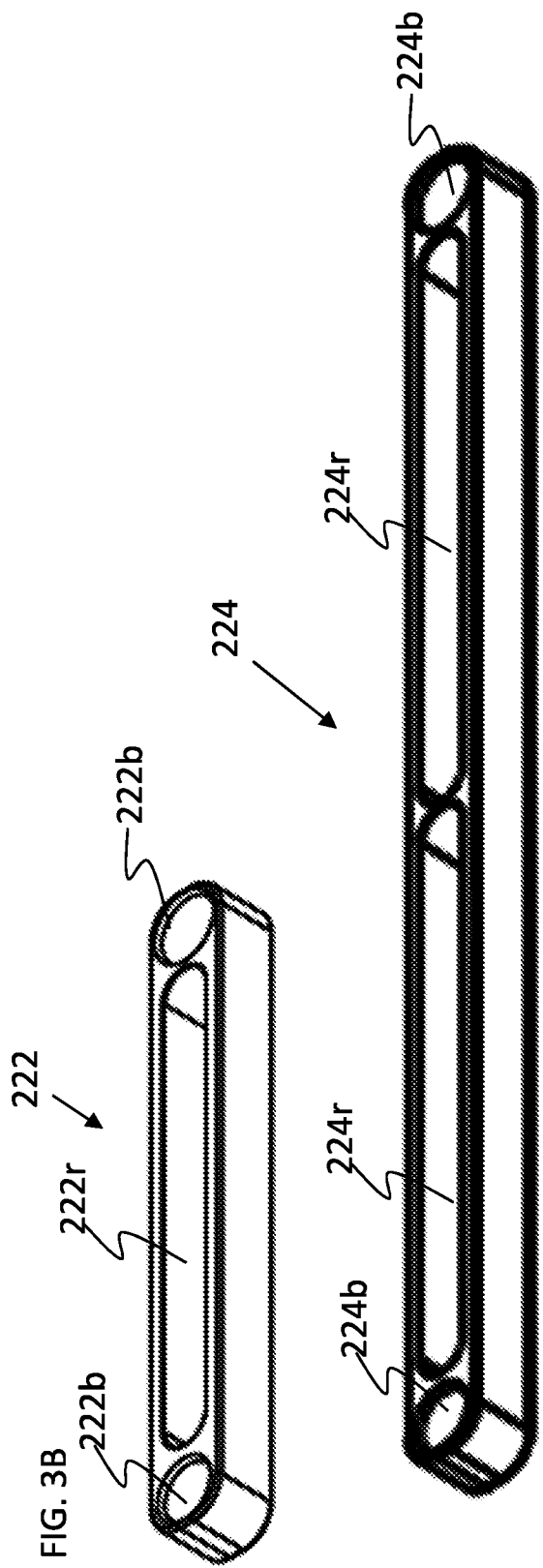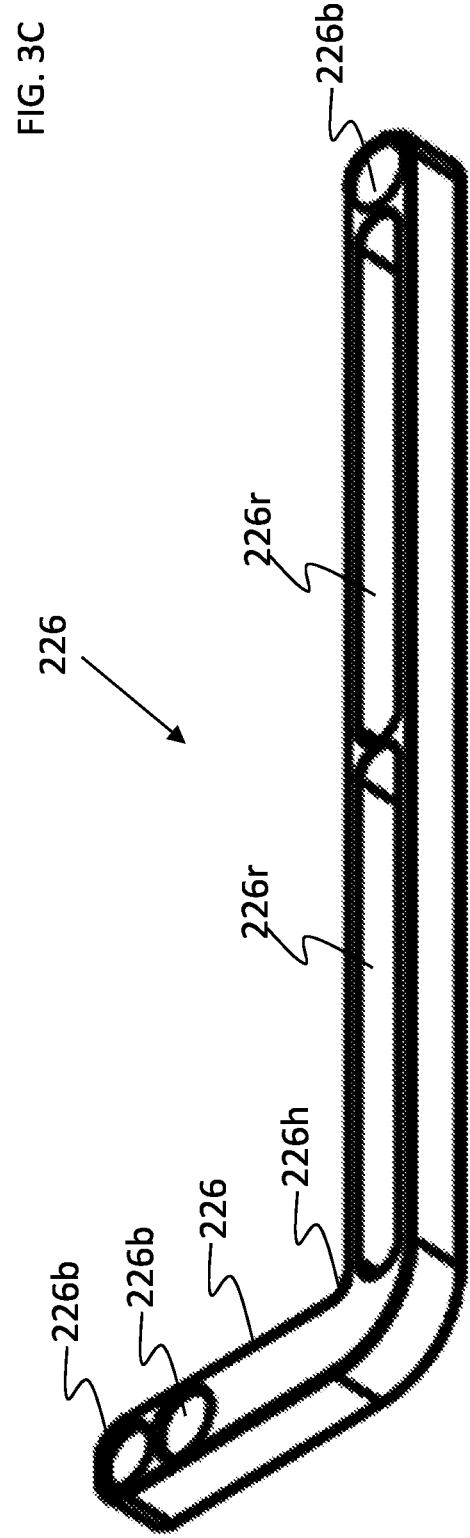

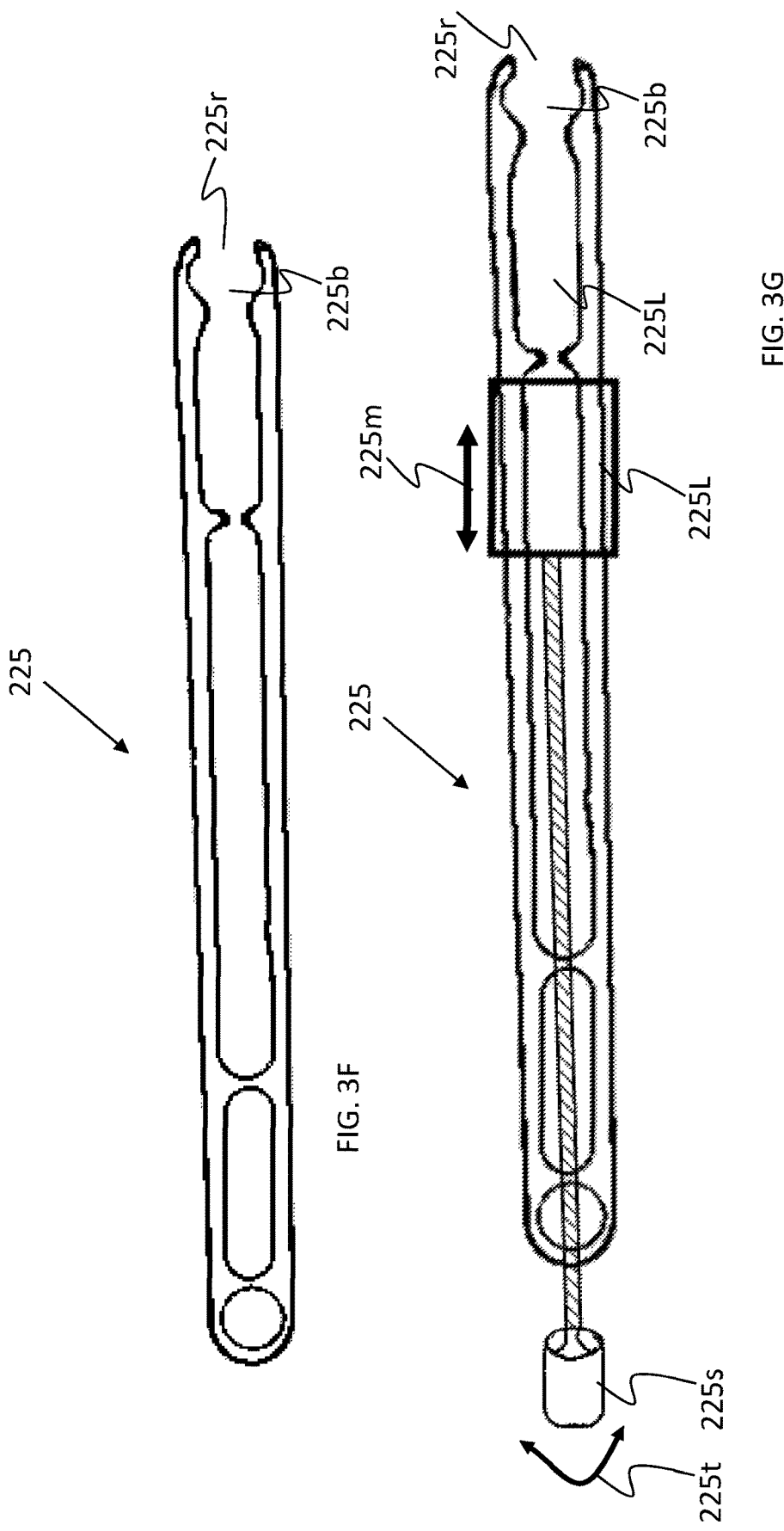

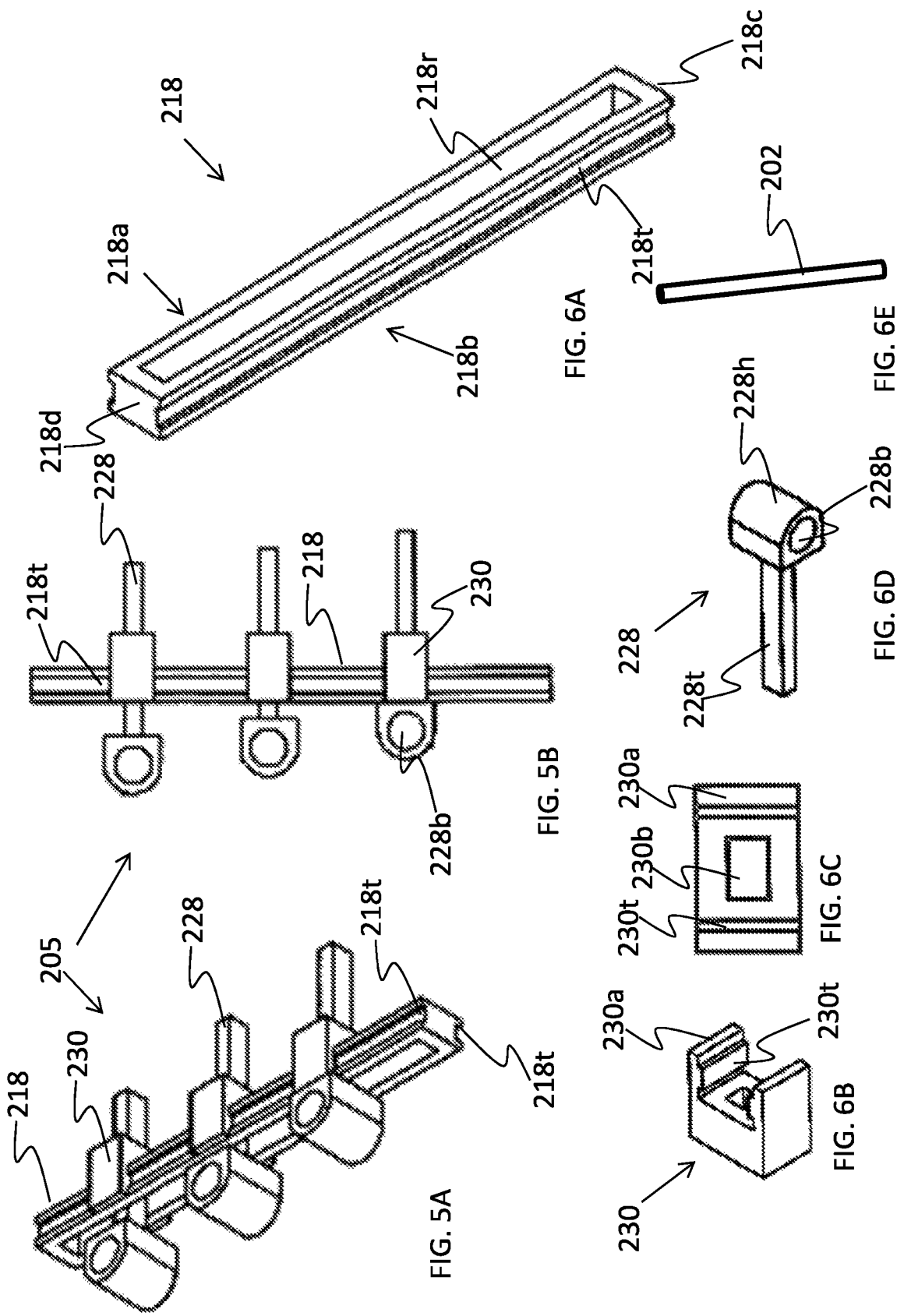

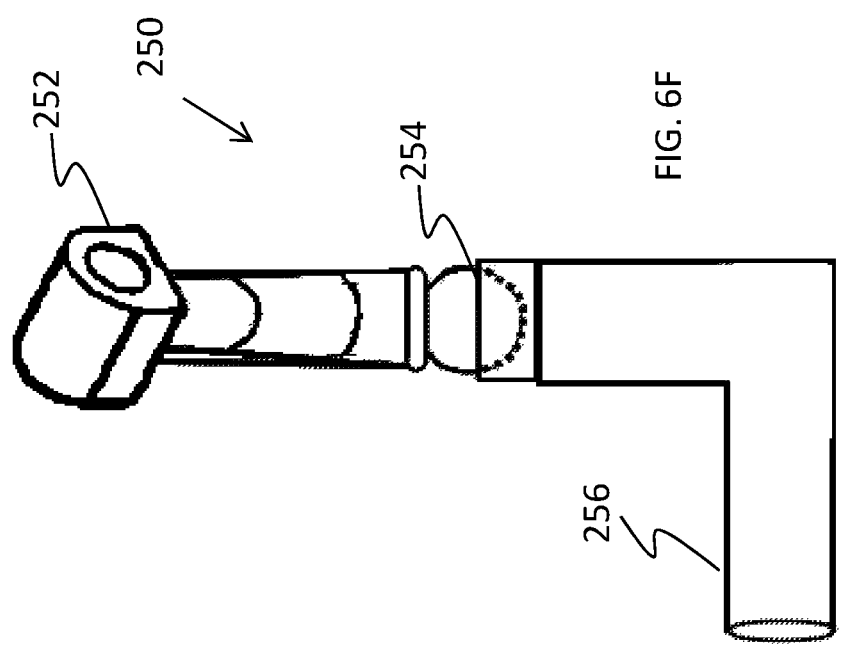

PARALLEL ALIGNMENT APPARATUS FOR FACILITATING PROSTHODONTIC RESTORATIONS AND METHOD OF USE

FIELD OF THE INVENTION

This disclosed subject matter relates to dental implant system in general and in particular to an apparatus for aligning portions of dental implant system.

BACKGROUND OF THE INVENTION

Dental implants are known in the art and typically include a dental anchor securely inserted into or onto the patient jawbone, and an abutment member attached to the dental anchor, for coupling a prosthodontic restoration thereon. Commonly, in the art, the abutment is affixed to the anchor through a fixation screw also known as an abutment screw.

A multitude of prefabricated abutments and implant systems of various designs are offered to clinicians in an effort to provide clinicians with necessary means to successfully restore edentulous patients.

In order to be successful, the implant anchor and all restorative devices associated therewith, should meet specific functional, biological and esthetic requirements. These requirements may be achieved if the restorative implant system, and/or devices used on the implants, adhere to major biomechanical principles, including: Preservation of implant structure; Passive retention and Passive support; Resistance form; Structural durability of the restoration; Marginal integrity and emerging profiling (marginal compliance); Retrievability and Retrofitting; Individuality; Preservation of the perio-implant tissues. Therefore, for a successful implant procedure to take place, the above mentioned biomechanical principles must be met.

A number of factors in the design of the abutments determine if a restoration can adhere to the previously mentioned biomechanical principles in order to achieve the desired functional, biological and esthetic requirements. For example, the abutment's connection to the anchor platforms has an effect on the abutment's position and stability.

Prior art abutments and/or restorative systems and/or portions thereof do not meet the above mentioned bio mechanical principals, leading to major drawbacks in the quality of the restoration. Due to these limitations, clinicians are forced to compromise the functional, biologic and esthetic requirements of the restoration. Such compromises may for example result in or lead to: shortening the survivability and/or viability of the implant, irreparable damage to host tissue; damaged implant structures, the requirement of laborious and prolong multi-stage and multiple surgical procedures, reduce access for maintenance of the host tissues, makes it very difficult and often impossible to maintain an implant's assembly elements and substantially increase costs.

SUMMARY OF THE INVENTION

Prior dental implant systems generate major drawbacks by providing unstable connection platforms and limited designs of abutments which restrict the abutment's shape, level of angulation and provide limited directionality control. Prior art dental implant systems substantially limit clinician's options to properly position an abutment (and the restoration mounted thereon) about other abutments and/or teeth of same and/or opposite jaw. Prior art dental implant systems do not provide an abutment assembly that may be adjusted with respect to individual morphology, specific clinical situation and according the biomechanical principles.

Similarly, current abutments do not allow for, parallel alignment between abutments and/or associated prepared teeth, and/or other teeth involved in the rehabilitation process. Proper shape, adequate position and/or parallel alignment are essential for providing the restoration with the attributes necessary to achieve the prosthodontics requirements according the biomechanical principles.

In order to enable rehabilitation prior restoration systems and/or abutments must have their position and/or alignment improved by additional adjustments (by milling and/or casting), resulting in another major drawback. The adjustments made by milling and/or casting causes the disruption of the shape and geometry of the prior art abutment and implant assembly, specifically, the formation of undercuts and/or irregularities leads to the reduction of abutment to restoration contact surface (therein leading to poor retention) and incomplete seating of restoration (leading to lower durability of restoration and percolation of fluids). Similarly, prior art abutments do not allow for the finish line to be individually adjusted in relation with the bone level, soft tissues, abutment's axis, and the occlusal plane, thus impeding the achievement of an adequate smooth well positioned finish line with proper width to receive the encountered forces and closely fit with restoration's margins.

The unstable connection systems and the lack of or inadequate finish line of prior systems causes gaps between the different implant system parts (for example between the anchor and abutment; restoration margins and abutment finish line) that lead to: percolation and retention of fluids and pathogens into implant-restoration structure about the vicinity of host tissue; irritation, inflammation and damage to perio-implant tissue; bad odor; bad taste; and damage to implant's elements and/or structures. Furthermore, prior systems lack a finish line altogether, resulting in weak, over contoured restoration margins which intrude perio-implant tissues, increasing food and plaque retention. Prior art systems provide limited options of standardized prefabricated pre-positioned finish lines, thus defining standard transmucosal abutment portion (abutment collar) which does not and cannot take into account various clinical situations. Moreover, a prefabricated finish line provided with prior art abutments does not provide for the improvement of the marginal seal, the formation of a healthy biologic width, and the required direction imperative to provide passive support to encountering forces.

Embodiments of the presently disclosed invention overcome the deficiencies of the prior art dental implant systems.

The presently disclosed subject matter relates to dental tools and methods of their use, that facilitate customizing and/or adjusting and/or manipulating a dental implant system or any of its elements and/or constituents, for example an adjustable implant abutment assembly or any elements thereof.

The adjustable and/or customizable dental implant system referenced herein and throughout this application is described in a co-owned and pending PCT Application No. PCT/IB2012/053829 the contents of which are incorporated herein by reference as if fully set forth herein.

The present invention overcomes the deficiencies of the background art by providing tools and their method of use that facilitate customizing a prosthodontic implant system, about at least one of its members or parts. Most preferably the dental tools of the present invention provide for positioning and configuring the prosthodontic implant system according to an individual's morphology and clinical situation, while allowing practitioners to fulfill the aforementioned biomechanical principles, including: Preservation of implant structure; Passive Retention and passive Support; Resistance form; Structural durability of the restoration; Marginal integrity (marginal compliance); Retrievability; Preservation of the period-implant tissues; and Individuality, therein most preferably achieving the prosthodontic requirements.

Optional embodiments of the present invention provide, tools for customizing and/or adjusting and/or manipulating at least one or more selected from the group of: an implant system about any member or portion thereof, and/or an implant post and/or an adjustable abutment pivot, or the like; for properly positioning and/or shaping in accordance with the prosthodontics requirements, the specific clinical situation and in respect to the biomechanical principles. Most preferably such proper positioning provides the appropriate alignment of the abutment about surrounding teeth, tissues, the occlusal plane and additional abutments. Most preferably proper positioning of an abutment for example includes but is not limited to an abutment's desired angle, direction and vertical dimension, the like or any combination thereof.

Optionally, the tools of the present invention may be utilized with any state of the art implant systems, implant post, abutment, and implant anchors or the like implant system member.

Optionally and most preferably, the tools of the present invention may be utilized to customize an implant system and/or abutment assembly to form a correctly positioned abutment assembly and/or post.

Optionally and preferably, tools of the present invention facilitate positioning of an implant abutment member according individual morphology and clinical situation, and/or clinician opinion.

Optionally and preferably dedicated tools may be utilized to customize an implant system and/or abutment assembly to form a finish line, which may be individually adjusted in relation with the bone level, soft tissues, abutment's axis, and the occlusal plane. The finish line may be defined and/or positioned with optional dedicated tool. Optionally the finish line may be positioned according to any clinical situation. Most preferably the finish line is configured to be just about parallel with the occlusal plane and/or other finish lines and substantially perpendicular about abutment axis. Most preferably such dedicated tools may provide the achievement of a smooth well positioned finish line with proper width to receive the encountered forces and closely fit with restoration's margins Most preferably the tools of the present invention allow an abutment assembly to be adjusted so as to assume a position that is substantially perpendicular to the occlusal plane and just about parallel with adjacent and/or other abutments and/or teeth. Thus essentially, the tools facilitate defining only one path of insertion and retrievability that is substantially parallel to the axis of the abutment and/or abutments.

The aforementioned positioning and/or parallel alignment of abutments and/or teeth in addition with the aforementioned position of the finish line provides the restoration with complete sitting, and allow the restoration margins to lie and closely fit against the finish line, synergistically increasing the, passivity of the retention, the passivity of the support and the resistance form, and determine that the implant structures, the implant elements and perio-implant tissues are not subject to harmful impact such as tension, sheer force, compression or torque By allowing the creation of one path of insertion and retrievability and a well-defined finish line most preferably the tools according to the present invention, provide for retrievability and retrofitting of a restoration. One path of insertion and retrievability preferably provides for improving the continuing maintenance of the implant, for example including but not limited to, replacement of the abutment or other prosthodontic elements, performance of additional surgical procedures, exercising hygienic evaluation, allow for the adjustment of the restoration in case an implant is lost, the like or any combination thereof.

A preferred embodiment of the present invention provides parallel alignment tools and/or devices and a method, adept to adjust, set, affix, and align one or more dental implant members, an implant abutment or an abutment assembly member in substantially parallel position in relation to at least one or more reference prosthodontics restoration element on the same jaw for example including but not limited to abutments, abutment assembly members, implant anchor, prosthodontic elements and/or teeth and/or restorations, the like, or any combination thereof.

Most preferably the parallel alignment tools provides for parallel alignment between the prosthodontic members and/or teeth thus providing for one path of insertion and retrievability for the restorations mounted thereon.

Most preferably the parallel alignment device and method according to the present invention provides the support and stability necessary for fixing and/or setting and/or maintaining the aligned parallel positioning by utilizing a filling material for example provided in the form of a curable and/or a self-curable and/or a dual curable, and/or any biocompatible, filling seals, cements and/or material.

Most preferably as the filling material cures it maintains and fixes and/or sets the position of the aligned elements such that they maintain parallel alignment position, or any position depicted by a clinician.

Optionally and preferably the filling material may be disposed about and/or between and/or within the aligned elements for example including but not limited to dental implant members, abutment assembly members, prosthodontics members, post, abutment occlusal portion, sleeve, interface member, the like or any combination thereof.

Optionally the parallel alignment device and method according to the present invention provides the support and stability necessary for fixing and/or setting and/or maintaining the aligned parallel positioning of the prosthodontics members by mechanical means, for example including but not limited to threading, friction, locking, the like or any combination thereof.

Optionally the parallel alignment device and method according to the present invention provides the support and stability necessary for fixing and/or setting and/or maintaining the aligned parallel positioning of the prosthodontics members by utilizing both mechanical means (as described above) and filling materials (as described above).

Optionally the device and method according to the present invention may further provide for guiding the surgical placement of an implant anchor according the clinical situation and preferably in substantial parallel alignment with other implant anchors and/or teeth. Most preferably the device and method according to the present invention provides for guiding a clinician to place an implant anchor in the required spatial location into the jaw bone. Most preferably, implant anchors should be placed within a jaw, as parallel as possible about other anchors and or adjacent teeth, within the limitations dictated by patient's individual morphology and/or the prosthodontics requirements.

An optional embodiment of the present invention provides a method for properly positioning, setting and affixing a prosthodontic restoration member in a parallel alignment with respect to at least one or more reference member disposed on the same jaw with the alignment tool according to optional embodiment of the present invention, wherein the alignment tool provides support and stability for the prosthodontics restoration member being aligned, therein defining one path of insertion and retrievability for the aligned prosthodontics restoration member, the method comprising:

a. Build up and position a reference abutment;
b. build up and position abutments that are to be aligned relative to the reference abutment;
c. associate a sleeve member over the positioned abutments;
d. couple a parallel alignment arm member with the sleeve member about a receiving bore with each abutment to be aligned;
e. couple a parallel alignment arm with the reference abutment about receiving bore;
f. stabilize, lock and center the abutment to be aligned within the sleeve with a locking nut;
g. align all the alignment arm members h. place bridge member over the alignment arm members;
i. sequentially disassociate the locking nut member from the abutment and introduce settable filling materials within the lumen of the sleeve, there after rein introducing the locking nut member allowing the filling material to set; and
j. allow time for curing thereafter remove bridge member and alignment arm members and continue restoration procedures.

Optionally the parallel position may be determined according one or more selected from the group prosthodontic requirements, clinical situation, individual morphology and clinician opinion, the like, or any combination thereof.

Optionally the adjusted prosthodontics member may be selected from the member for example including but not limited to a dental over denture abutments, attachments, telescopes, balls, O-rings, magnetic, in substantial parallel position relative to the reference member.

An optional embodiment of the present invention provides a method for determining and identifying an optimal parallel location for anchoring a dental implant system relative to a reference implant anchor and/or abutment, the method comprising, a. Build up and position the reference abutment and/or implant anchor
b. Associate an alignment arm with the reference abutment and/or implant anchor;
c. Associate a bridge member according to the present invention with the reference alignment arm forming a reference bridge member;
d. Associated additional alignment arms through the recess of the reference bridge member wherein each additional alignment arm provide for determining and identifying the optional and parallel location for placing additional anchors within the same jaw.

Optionally additional alignment arms may be utilized as a drill guide for forming a borehole for receiving an anchor.

Within the context of this application the term prosthodontic member may for example include but is not limited to a dental implant anchor, and/or abutment, an abutment assembly member, post, sleeves, overdenture abutment, or the like.

Within the context of this application the term adjustment is to refer to any manipulation or change and/or customization to a given implant structure or member thereof for example including but not limited to changing, tilting, height adjustment, shaping, forming, bending or the like. Optionally adjustments may be made with tools, conventional tools and/or dedicated proprietary tools.

Within the context of this application the term abutment and abutment assembly may be used interchangeably.

Within the context of this application the term pivot and abutment pivot and post assembly may be used interchangeably.

Within the context of this application the term occlusal end refers to that portion of the abutment and/or abutment member positioned or directed toward the coronary portion of a tooth.

Within the context of this application the term apical end refers to that portion of the abutment and/or abutment member positioned and/or directed toward the apex of the implant anchor, for example toward the root of a tooth.

Within the context of this application the term prosthodontic requirements refers to the biologic requirement, aesthetic requirement and functional requirements that adhere to the biomechanical principles most preferably to ensuring a proper restoration outcome with respect to the individual's morphology and/or clinical situation.

Within the context of this application the term angle refers to the angle assumed by the abutment by way of customization and/or adjustment, with respect to and/or in relation to the occlusal plane, implant's anchor axis and/or mounting member and/or alveolar bone and/or adjacent teeth, abutments, restorations, on the same and/or opposite jaw.

Within the context of this application the term direction refers the direction assumed by the abutment by way of customization and/or adjustment, wherein the direction is defined by the projection of the abutment within any angle along the 360 degrees of the occlusal plane.

Within the context of this application the term position refers to the spatial disposition of the abutment, abutment assembly or members thereof, for example including but not limited to the interface member, finish line, post, pivot occlusal portion or the like. Optionally and preferably the position may be assumed by way of customization and/or adjustment, derived and/or depicted by the angle, direction, and distance between adjacent anatomical structures for example including but not limited to teeth, bone, gingiva, tongue, lips or the like, and/or additional abutments, abutment assembly members, of same or opposite jaws.

Although the specification and figures describe the present invention with respect to an adjustable dental abutment assembly, embodiments of the present invention may be equally utilized with any state of the art dental implant systems. For example the tilting tool of the present invention may be utilized on a state of art dental implant abutment and/or post and is not limited to the dental abutment described in co-owned and co-pending PCT/IB2012/053829.

Unless otherwise defined, all technical and scientific terms used herein have the same meaning as commonly understood by one of ordinary skill in the art to which this invention belongs. The materials, methods, and examples provided herein are illustrative only and not intended to be limiting.

Importantly, this Summary may not be reflective of or correlate to the inventions protected by the claims in this or continuation/divisional applications hereof. Even where this Summary is reflective of or correlates to the inventions protected by the claims hereof, this Summary may not be exhaustive of the scope of the present inventions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A shows the final product after implantation and restorative process is complete, with the prosthodontic restoration in place; FIG. 1B-C show a partial cut away perspective view of optional stages during the restoration process over an implant anchor system of FIG. 1A, showing an adjusted and aligned abutment pivot, FIG. 1B, and a mounted sleeve, FIG. 1C, according to an optional embodiment of the present invention;

FIG. 2A is an exploded view of an abutment assembly; FIG. 2B is an assembled view of the abutment assembly following adjustments;

FIGS. 3A-G show schematic illustrations of members of an alignment tool according to an optional embodiment of the present invention; FIG. 3A shows an optional aligning bridge member; FIG. 3B-D show optional aligning arms members; FIG. 3E shows a schematic illustration of an optional locking pin and nut members; FIG. 3F-G show optional aligning arms members;

FIGS. 5A-B show various views of a schematic illustration of further optional assembly of the parallel alignment tool according to an optional embodiment of the present invention;

FIG. 6A-E show various views of the individual parallel alignment tool members according to an optional embodiment of the present invention depicted in FIG. 5A-B; FIG. 6A shows a perspective view of an optional bridge member; FIG. 6B shows a perspective view of an optional mediating member; FIG. 6C shows a face one view of an optional mediating member; FIG. 6D shows a perspective view of an optional alignment arm coupling member; FIG. 6E shows a schematic illustration of an optional locking pin;

FIG. 6F shows a schematic illustrative diagram of an alignment orientation member that may be associated the alignment apparatus members, according to an optional embodiment of the present invention;

DESCRIPTION OF THE PREFERRED EMBODIMENTS

The principles and operation of the present invention may be better understood with reference to the drawings and the accompanying description. The following figure reference labels are used throughout the description to refer to similarly functioning components are used throughout the specification hereinbelow.

Figure 1A:
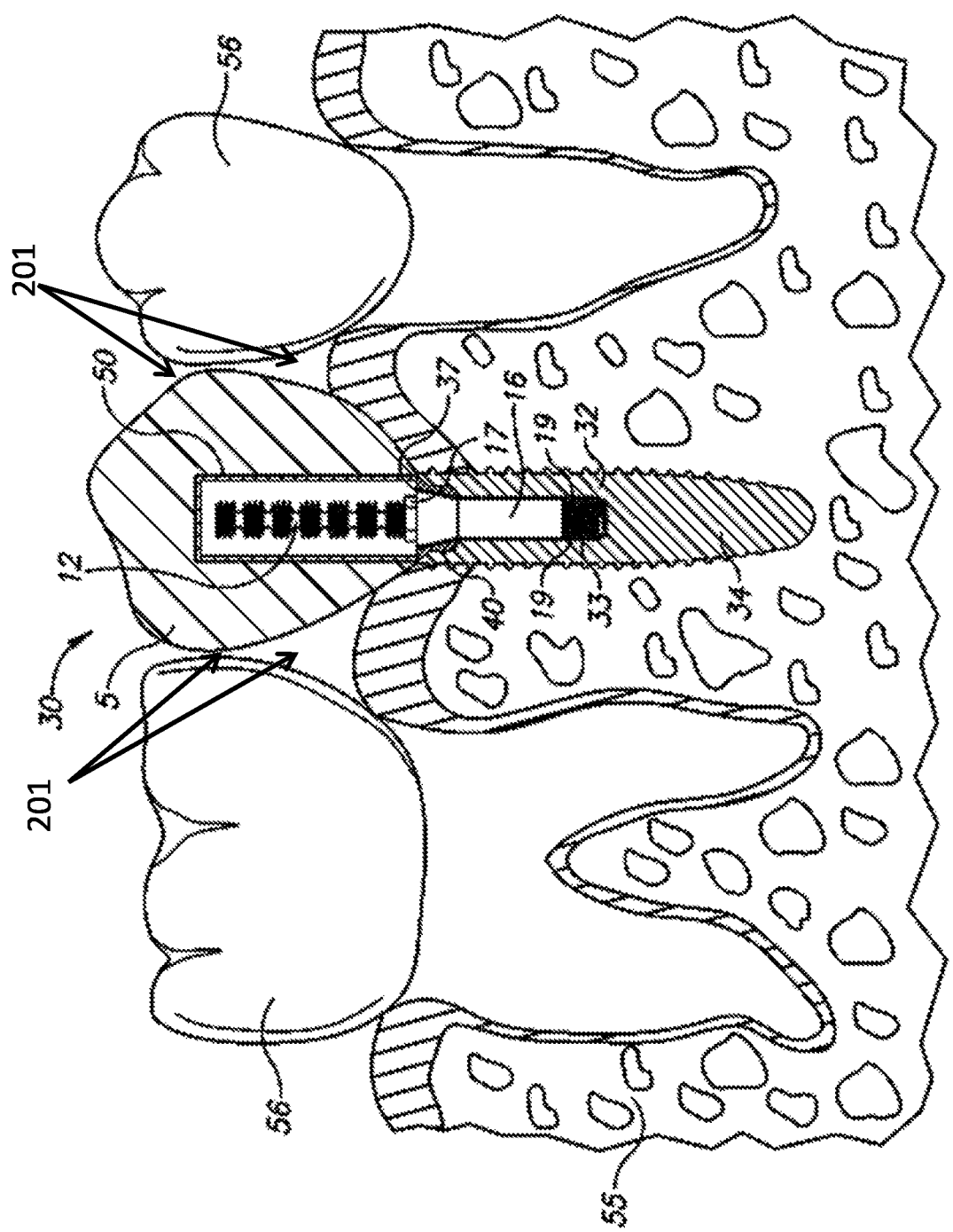
FIG. 1A-C are sectional views of a dental implant system placing a prosthodontic restoration within a jaw.

5 prosthodontic restoration;
10 abutment assembly;
12 abutment pivot;
12*a* pivot projection/pivot occlusal portion;
17 screw head interface;
19 screw thread;
22 second angle;
30 dental implant system;
32 conventional implant anchor;
33 screw thread;
34 screw thread;
37 opening;
40 interface member;
46*a* flange;
50 sleeve;
50*s* sleeve assembly;
52 inner sleeve member;
52*t* inner sleeve threading;
54 outer sleeve member;
55 jawbone;
56 residual teeth;
70 locking nut;
205, 200 Parallel alignment tool assembly;
201 adjacent prosthodontic margins;
202 locking pin member;
202*a* locking nut member;
210 alignment bridge;
210*a,b* longitudinal parallel surfaces;
210*c,d* parallel end surfaces;
212 bridge bore;
214 bridge closing member;
216 bridge alignment recess;
218 Dual axes alignment bridge;
218*r* alignment bridge recess;
218*t* alignment track/rail;
218*c,d* bridge end;
220 alignment arm members;
220*b* alignment arm receiving bore;
220L alignment arm Large bore;
220S alignment arm Small bore;
220*r* receiving bore;
222 short alignment arm member;
222*b* receiving bore;
222*r* arm recess;

224 long alignment arm member;
224b sleeve receiving bore;
224r arm recess;
225 clamp alignment arm;
225b clam alignment arm bore;
225L clamp locking member;
225m clamp locking direction;
225r clamp opening recess;
225s locking screw;
225t lock screw direction;
226 hinged alignment arm member;
226b sleeve receiving bore;
226h hinge point;
226r arm recess;
228 dual axes alignment arm member;
228b dual axes alignment arm member receiving bore;
228h head portion;
228t tail portion;
230 mediating member;
230a mediating member flanking arms;
230b mediating member bore;
250 anchor orientation member;
252 orientation head;
254 orientation controller/selector;

FIG. 1A is a side sectional view of a jawbone 55, having a customizable dental implant system 30 implanted therein, between natural teeth 56. The customizable dental implant system referenced herein and throughout the specification is described in a co-owned and pending PCT Application No. PCT/IB2012/053829 the contents of which are incorporated herein by reference as if fully set forth herein.

Adjustable dental implant system 30 comprises an implant anchor 32, prosthodontic restoration 5 and an abutment assembly 10. Most preferably state of the art implant anchors 32 is provided to replace the native tooth root (apical end), while abutment 10 and restoration 5 provide to replace the coronary portion of the tooth (occlusal end). Customizable dental implant system 30 is characterized in that it comprises an adjustable and/or customizable abutment assembly 10. FIG. 1A shows an implant system 30 after it has been customized and adjusted to account for the prosthodontic requirements with respect to the individual's morphology and/or clinical situation, so that the implant system 30 may properly fit with adjacent abutments and/or teeth and/or tissue.

Abutment assembly 10 may be formed from variable combinations of members including abutment pivot 12 having a pivot mounting member/portion 16 and occlusal portion 12a, that form the core of abutment assembly 10. Abutment assembly 10 may further comprises, at least one or more members selected from the group consisting of a sleeve 50, sleeve assembly 50s, inner sleeve member 52, outer sleeve member 54, composite buildup about pivot occlusal portion 12a (not shown), an interface member 40, and a locking nut member 70 and locking member plug 72 (not shown).

Optionally and preferably any member or portion of implant system 30 or abutment assembly 10 may be adjusted and/or customized as necessary with dedicated tools, some embodiments of which are described herein.

Most preferably dedicated tools, provide for adjusting abutment assembly 10, about at least one member thereof, to be adjusted and/or positioned according to at least one or more prosthodontic parameters, to ensure alignment of abutment 10 relative to residual teeth and/or other abutments on the same and opposite jaw, and surrounding tissue. For example, abutment assembly 10 may be adjusted with dedicated tools, about at least one or more of its members, most preferably including but not limited to at least one of pivot 12 and/or interface member 40.

For example, parallel alignment device 200, 205 according to optional embodiments of the present invention may be utilized to position and affix abutment assembly 10 comprising a sleeve 50 (FIG. 4C-D) to assume a substantially parallel alignment relative to residual teeth and/or abutments on the same jaw.

Figure 1B:
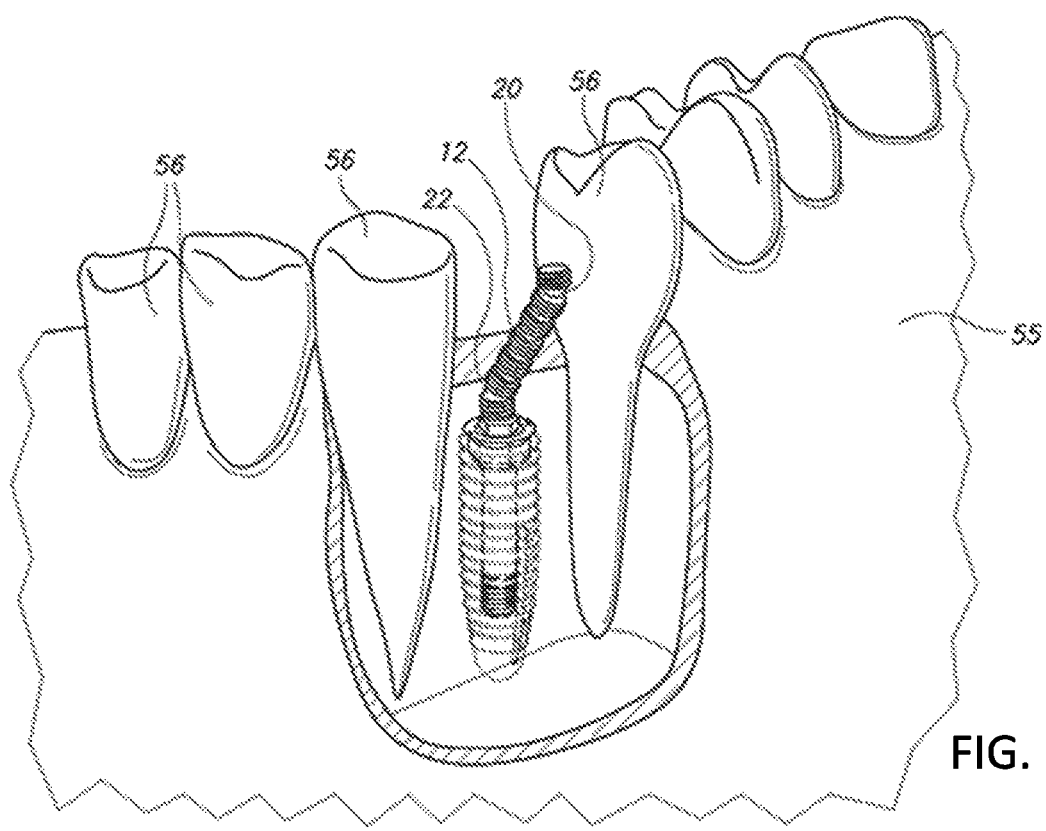
Figure 1C:
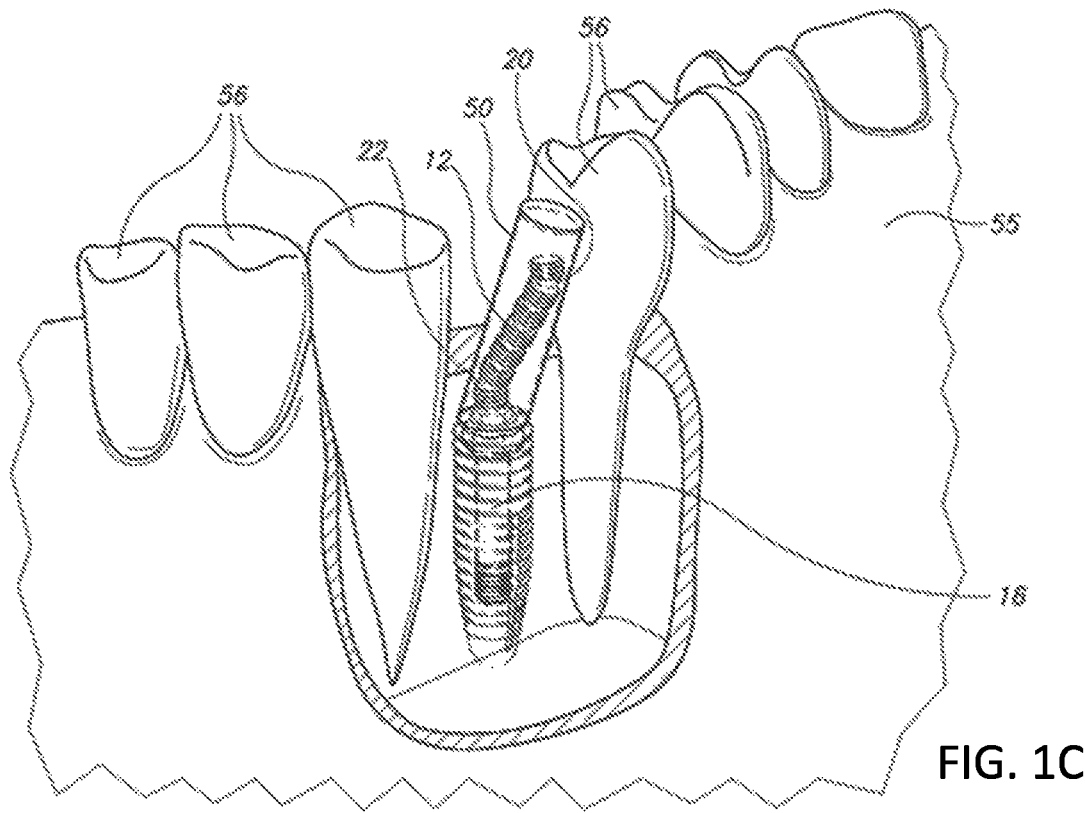

FIGS. 1B and 1C, show an adjusted abutment assembly 10 adjusted about pivot 12, with optional dedicated tools, to assume a desired position so as to allow appropriate alignment of the abutment assembly 10 with respect to other abutments and/or residual teeth on the same and opposite jaw. Abutment assembly 10, FIG. 1C, may be aligned and fixed to assume a parallel position relative to adjacent teeth 56, with optional tools 200,205 according to optional embodiments of the present invention. Pivot 12 may be adjusted, with optional dedicated tools, in more than one location along its length, about at least one or more adjustment portion 14, so as to achieve the appropriate positioning of pivot 12. Dedicated tools, may be utilized to customize the occlusal portion 12a of pivot 12 to assume the proper position and/or length relative to other abutments and/or residual teeth on the same and opposite jaw. For example, dedicated tools may be utilized to adjust pivot 12 to assume a first angle 20 at its apical portion and may be adjusted further to form a second angle 22 on an occlusal portion thereof, so as to achieve the required position and shape of the abutment assembly 10. Optionally abutment pivot 12 may be configured and/or adjusted by a clinician outside of the patient's mouth, after the appropriate prosthodontic requirements and measurements have been considered in order to determine the position and shape of abutment 10 prior to securely coupling with anchor 32.

Once the position, direction, angle and length required for pivot 12 are determined, sleeve 50 or sleeve assembly 50s may be disposed over pivot 12, with or without filling material therebetween. Optionally and preferably dedicated tools may provide for adjusting sleeve members 50,50s to assume the proper height for example with relative to other abutments and/or residual teeth on the same and opposite jaw Optionally when utilizing sleeve assembly 50s inner sleeve 52 and outer sleeve 54 are both adjusted to securely fit over pivot 12 in a concentric manner where, inner sleeve 52 is associated or otherwise coupled with pivot 12, as described above with respect to sleeve 50, then sleeve 54 may be adjusted with respect to sleeve 52 and disassociated therefrom. Outer sleeve 54 may then be associated with restoration 5 about bore 5a to defining the path of insertion for restoration 5 that is specific to the configuration of inner sleeve 52 and therein pivot 12.

Figures 2A, 2B:
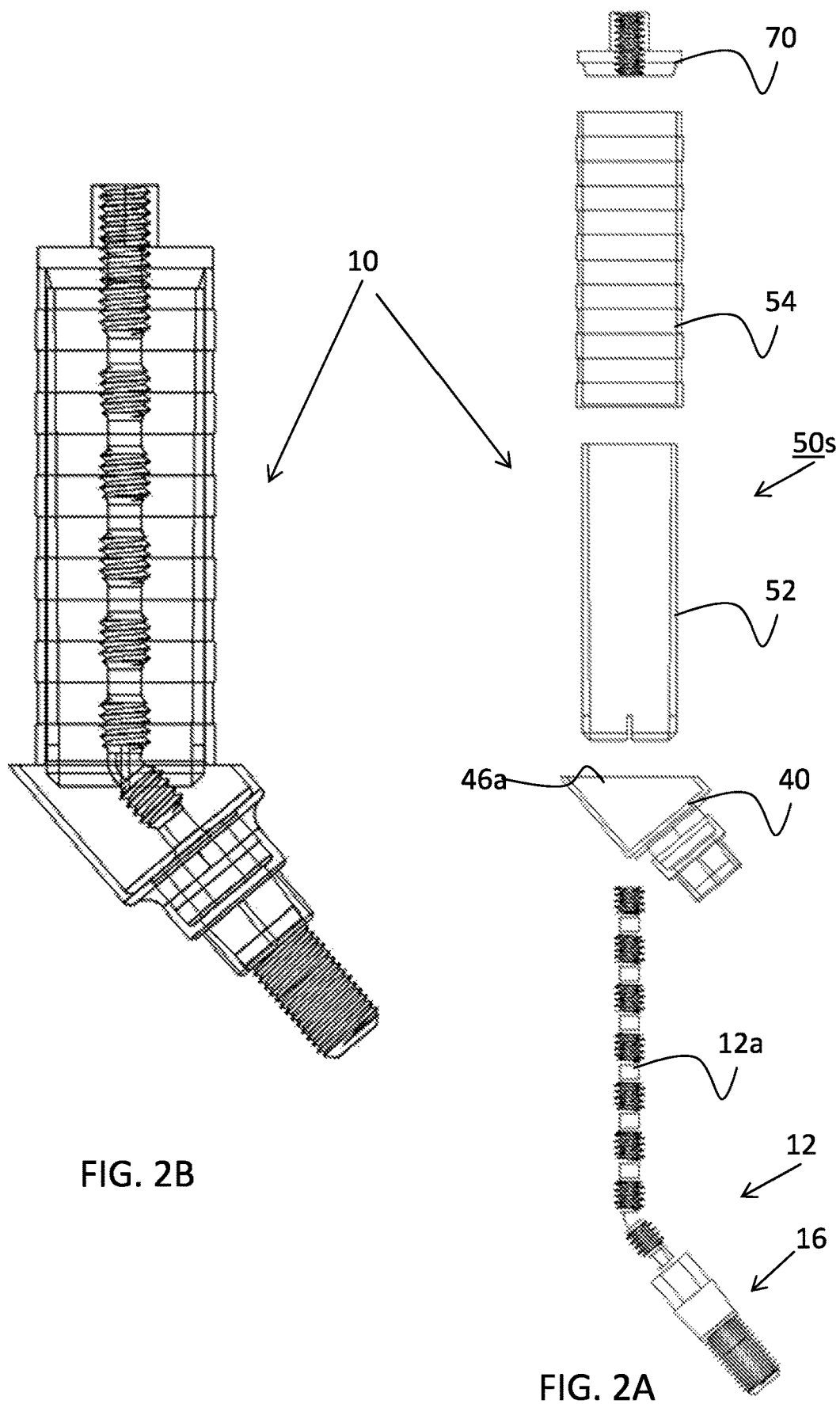
FIG. 2A-B show varying views of a dental implant system comprising an adjustable abutment assembly, that may be adjusted and/or manipulated with the tools according to optional embodiments of the present invention.

FIG. 2A shows an exploded view of an optional abutment assembly 10 comprising, abutment pivot 12 with an integrated pivot mounting member 16, interface member 40, sleeve assembly 50s comprising an inner sleeve 52 and an outer sleeve 54, and locking nut 70. FIG. 2B shows an assembled view of exploded view depicted in FIG. 2B showing an assembled abutment 10 comprising an adjusted abutment pivot 12 and interface member 40. As shown at least one or more portions and/or members comprising abutment 10 may be adjusted with dedicated tools accounting for at least one or more prosthodontic parameters. For example, pivot 12 may be adjusted with dedicated tools so as to obtain any position to ensure alignment relative to residual teeth and/or abutments on the same and opposite jaw. Optionally, interface member 40 may be adjusted, with dedicated tools, sized and/or contoured, for example as shown, defining a flange 46a (forming the finish line) with optional dedicated tool. Most preferably interface member 40 may be adjusted with respect to the gingival tissue, alveolar bone and in relation to pivot 12 to provide abutment 10, with the correct position and shape while conforming to the biomechanical principles and prosthodontic requirements. Most preferably with the use of optional dedicated tools the proper direction, position and angulation of abutment assembly 10, relative to the axis of implant anchor 32 and the occlusal plane, ensures that a restoration 5 is provided with proper alignment relative to residual teeth and/or abutments on the same and opposite jaw.

Optionally and most preferably interface member 40 may be adjusted with at least one or more optional dedicated tools, such that it is apically reduced by cutting and/or filing in relation with the alveolar bone, the gingiva, and is substantially perpendicular with respect to the adjusted abutment pivot 12 and substantially parallel to the occlusal plane. Optionally interface member 40 may be adjusted in any relation to the alveolar bone, and the gingiva regardless the position of pivot 12 and/or the occlusal plane.

As shown abutment assembly 10 is most preferably centered and/or built around pivot 12, therein pivot 12 provides for receiving and/or associating with interface member 40, sleeve members 52, 54, and locking nut 70 essentially in a concentric manner.

Referring now to FIGS. 3-7 showing optional embodiments of a parallel alignment apparatus 200, 205 according to the present invention. Most preferably parallel alignment tool 200 provides for aligning and/or positioning and setting at least one or more prosthodontic restoration member and/or elements into a parallel position in relation with other prosthodontic restoration member/elements, abutments, adjacent teeth 56 and/or restorations 5 on the same jaw, ensuring formation of proper parallel alignment and margins 201 (FIG. 1A). Optionally and preferably the prosthodontic restoration member may for example include but is not limited to a an implant anchor, member of dental implant system 30, a member of abutment assembly member 10, post, sleeve(s) 50, 50s, 52, 54, overdenture abutment (not shown), any combination thereof or the like.

Most preferably the parallel alignment tool 200, 205 provides for setting and/or fixing the prosthodontic restoration member in the parallel position, by allowing a curable and/or settable filling material, for example composite material, disposed within the prosthodontic restoration member to cure and/or set, therein securing and/or ensuring the parallel positioning.

Most preferably parallel alignment tool assembly 200 comprises an alignment bridge member 210 and at least one and more preferably a plurality of alignment arms members 220. Most preferably bridge member 210 provides for receiving at least one or more arm member 220 about a central recess 216, 218b.

Optionally parallel alignment tool assembly 200 may further comprise a locking pin member 202 and nut member 202a. Optionally parallel alignment tool assembly 200 may further comprise a mediating member 230 for mediating between alignment arm members 220 and bridge member 210.

FIG. 3A shows a schematic illustration of an optional embodiment of an alignment bridge member 210 comprising a substantially rectangular frame body. Bridge member 210 comprises a central opening and/or alignment recess 216 defining the frame body, provided for receiving at least one or more alignment arm member 220. The frame body having two opposing substantially parallel surfaces 210a,b about the length of bridge 210 that are coupled about two substantially parallel ends 210c,d. Most preferably ends 210c,d define the width of bridge 210 and recess 216. Most preferably surface 210a,b define the length of bridge 210 and recess 216.

Optionally each of parallel surfaces 210a,b may comprise at least one or more corresponding bores 212. Optionally and preferably bores 212 may provide for receiving a locking pin member 202 (FIG. 3E). Optionally bore 212 may be variably spaced and sized (diameter) about the length of bridge 210 about surfaces 210a,b. Optionally locking pin member 202 may be locked over corresponding bores 212 with locking nuts 202a, as shown in FIG. 3E.

Figure 4A:
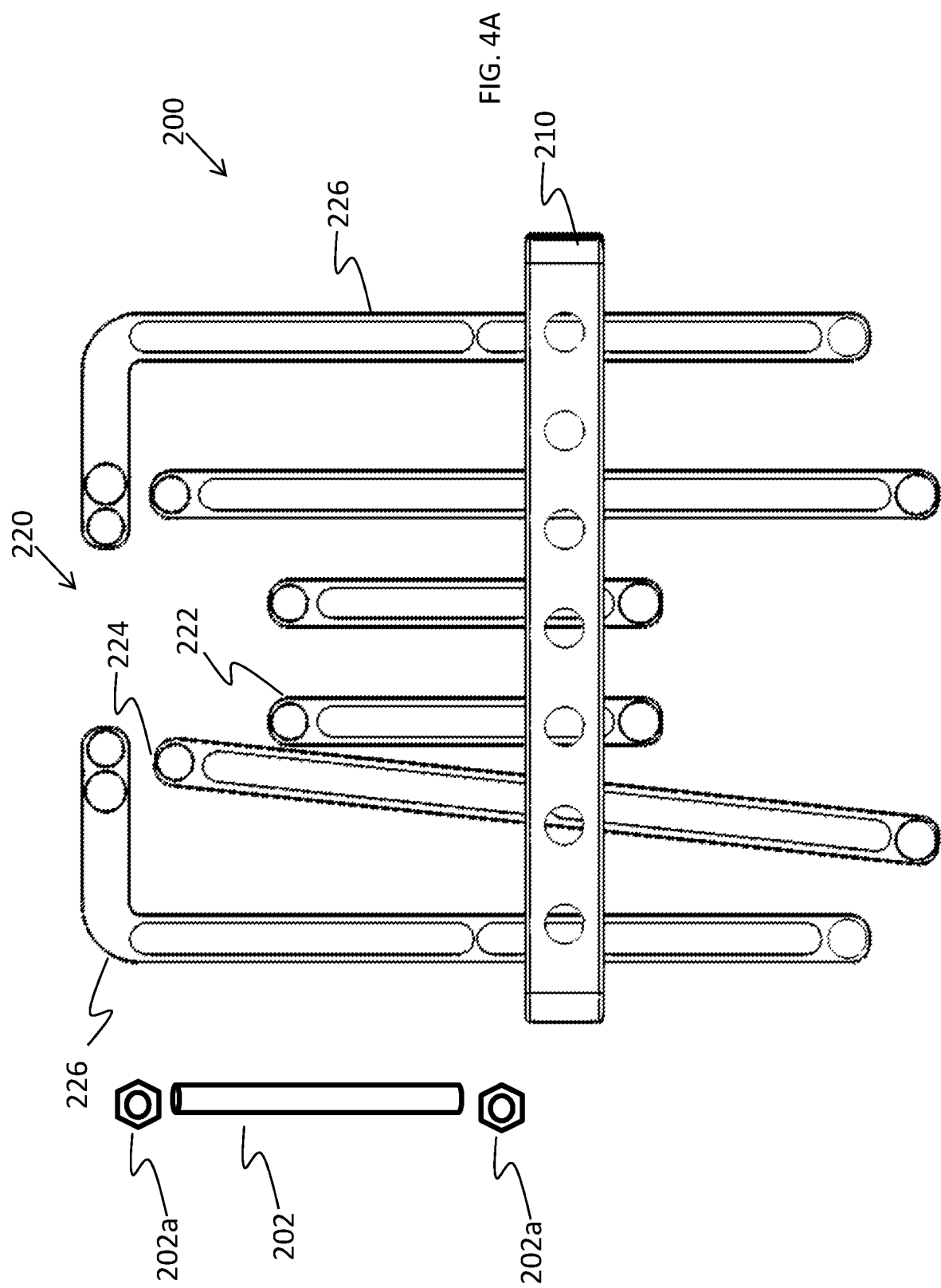
FIGS. 4A-B show optional views of a schematic illustration of an assembly of the parallel alignment tool members depicted in FIG. 3A-E according to an optional embodiment of the present invention.
Figure 4B:
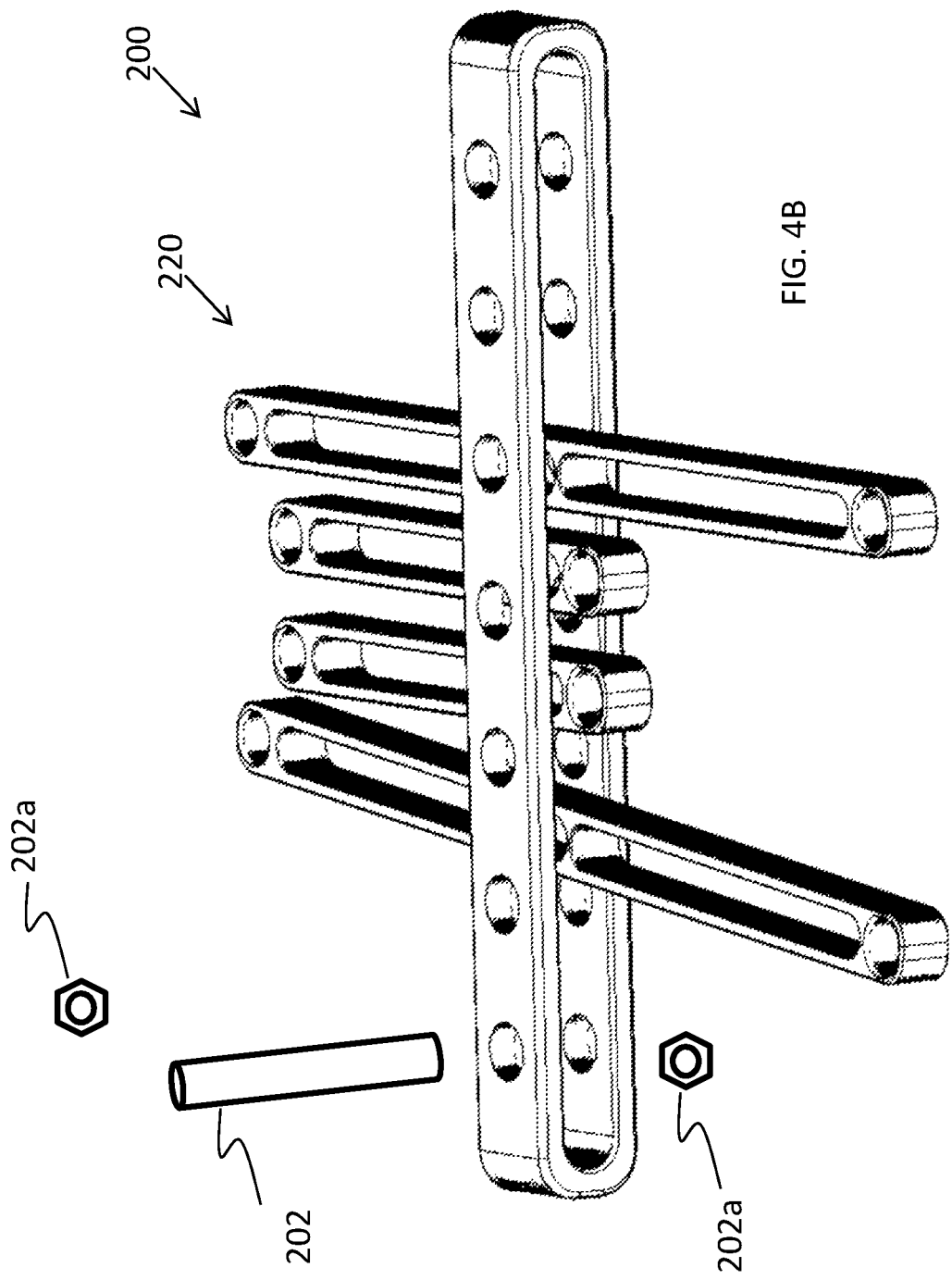
Figures 4C, 4D:
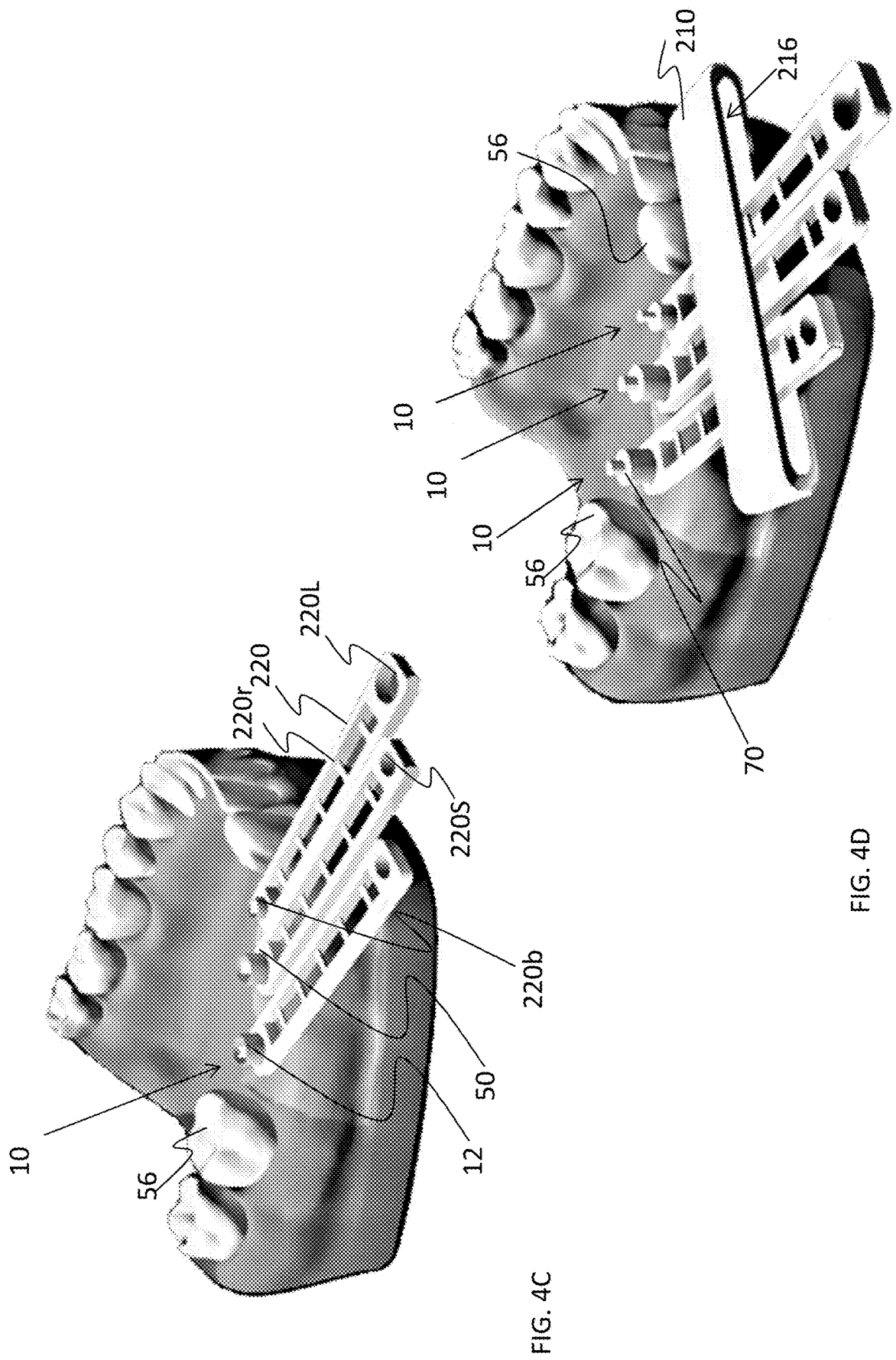
FIG. 4C-D show illustrations showing an implementation of the parallel alignment tool according to optional embodiments of the present invention.

Optionally bridge parallel surfaces 210a,b may be provided from a single continuous material devoid of any recesses and/or bores, for example as shown in FIG. 4D.

Optionally bridge 210 may be configured to be a closed structures and/or fixed shape such that recess 216 is provided with preset and/or static shape and dimension. Optionally when bridge 210 is provided as closed structure, bridge 210 is configured to receive alignment arm members 220 thought recess 216.

Optionally bridge 210 may be configured to assume an open configuration, that may be closed and/or opened about at least one end 210c,d. For example end 210d may comprise a hinge member while end 210c may comprise a closing member 214, as shown. Therein bridge 210 may be opened where recess 216 may assumes an open configuration, most preferably to facilitating receiving at least one or more alignment arm member 220, and then closed about closing member 214 to close recess 216.

Optionally bridge 210 may be configured to assume an open configuration that may be closed and/or opened relative to a common hinge and/or axes and/or rail.

FIG. 3B-D shows various embodiments of alignment arm members 220 having variable sizes and shapes, about at least its length and/or width. Most preferably at least one or a plurality of alignment arm members 220 may be associated with bridge 210 through recess 216, wherein bridge 210 provides a guide for individual alignment arm member 220 so as to ensure parallel alignment with adjacent teeth and/or abutments about the same jaw.

Most preferably alignment arm members 220 may be provided with variable lengths and shapes, as shown 222, 224, 226 ranging from short to long. Optionally and preferably the length of alignment arm members may be selected relative to the sagittal position along the jaw of the element subject to alignment. For example the closer the adjustment member to the frontal segment of the jaw the shorter the alignment arm member required.

Alignment arm member 220 may comprise a substantially rectangular elongated body including at least one or more receiving bores 222b, 224b, 226b disposed adjacent to and/or near and/or about the end of alignment arm member 220. Most preferably receiving bores 222b, 224b, 226b may be provided with different diameters, shapes and/or sizes to fit with the appropriate prosthodontic restoration member, for example including but not limited to optional sleeves 50, 52, 54, 50s, for example as shown in FIG. 4D. Optionally receiving bores 222b, 224b, 226b, as shown, may be used to receive an optional sleeve (50, 52, 54) of variable diameters. Optionally receiving bores 222b, 224b, 226b, may be orientated and/or angled to assume an angle of up to about 90 degrees.

Optionally alignment arm members 220 may comprise at least one or more central recess for example, 222*r*, 224*r*, 226*r*, as shown, optionally provided so as to minimizing the materials used and costs of manufacture.

Optionally recess 222*r*, 224*r*, 226*r* may be utilized to receive and/or otherwise associated with locking pin 202. Preferably locking pin 202 may be and locked into position with locking nut member 202*a*, over corresponding bore 212.

FIG. 3B shows a short alignment arm member 222 most preferably provided for associated with a prosthodontic restoration member near or proximal to the front teeth, therein requiring a shorter body, therein requiring a shorter body to ensure alignment between adjacent teeth and/or abutments about the same jaw about a parallel plane.

Alignment arm member 222 comprises a plurality of receiving bores 222*b* disposed at either ends thereof, for example as shown. Optionally and more preferably each receiving bore 222*b* may be provided with a different diameter so as to fit different sleeve members 50, 52, 54, 50*s* having different diameters.

Alignment arm member 222 is shown to have an elongated body that is substantially rectangular, however alignment arm members 220 are not limited to such rectangular shape.

Optionally alignment arm member 222 may comprise at least one or more recesses 222*r*, as shown. Optionally recess 222*r* may be continuous, as shown, or intermittent.

Optionally recess 222*r* may be utilized to receive and/or couple or otherwise associate with locking pin 202. Preferably locking pin 202 may be locked into position with locking nut member 202*a*, over corresponding bore 212.

Optionally the width of exertion member 222 may be provided in optional sizes to ensure the optimal marginal spacing between at least one or more adjacent teeth and/or restoration on the same jaw.

FIG. 3C shows a long alignment arm member 224 most preferably provided for associated with a prosthodontic restoration member farther from or distal to the front teeth or frontal segment, therein requiring a longer body to ensure alignment between adjacent teeth and/or abutments about the same jaw about parallel planes.

Alignment arm member 224 comprises a plurality of receiving bores 224*b* disposed at either ends thereof, for example as shown. Optionally and more preferably each receiving bore 224*b* may be provided with a different diameter so as to fit different sleeve members 50 having different diameters.

Alignment arm member 224 is shown to have an elongated body that is substantially rectangular, however alignment arm members 220 are not limited to such rectangular shape.

Optionally alignment arm member 224 may comprise at least one or more recesses 224*r*, as shown. Optionally recess 224*r* may be continuous or intermittent, for example as shown.

Optionally recess 224*r* may be utilized to receive and/or couple or otherwise associate with locking pin 202. Preferably locking pin 202 may be and locked into position with locking nut member 202*a*, over corresponding bore 212.

FIG. 3D shows an optional alignment arm member 220, provided in the form or an L-shaped or hinged alignment arm member 226 most preferably provided for associated with a prosthodontic restoration member, provided for substantially distal positions, therein requiring a longer and angled body to ensure alignment between adjacent teeth and/or abutments about the same jaw about parallel planes.

Alignment arm member 226 comprises a plurality of receiving bores 226*b* disposed at either ends thereof, for example as shown. Optionally and more preferably each receiving bore 226*b* may be provided with a different diameter so as to fit different sleeve members 50 having different diameters.

Hinged alignment arm member 226 as shown has an elongated L-shaped body that is substantially rectangular, however alignment arm member 226 is not limited to such rectangular shape. Optionally hinged alignment arm member 226 comprises a hinge point 226*h*, as shown, that may provide with a hinge, ratchet or the like angle control member (not shown) for adjusting the angle formed at hinge point 226*h*, to assume any angle for example up to about 180 degrees. Optionally hinged alignment arm member 226 may be customized about hinge point 226*h* to assume the angle of an individual's jaw.

Optionally alignment arm member 226 may comprise at least one or more recesses 226*r*, as shown. Optionally recess 226*r* may be continuous or intermittent, as shown.

Optionally recess 226*r* may be utilized to receive and/or couple or otherwise associate with locking pin 202. Preferably locking pin 202 may be and locked into position with locking nut member 202*a*, over corresponding bore 212.

FIG. 3F-G show a schematic illustration of an optional clamp alignment arm 225, similar to alignment arms 222, 224 as shown in FIG. 3B-C. Optionally clamp alignment arm 225 may be provided in optional shapes and configuration for example similar to the "L-shaped" alignment arm 226 shown in FIG. 3D.

Clamp alignment arm 225 is characterized in having a split borehole 225*b* at one end of arm 225, wherein borehole 225*b* comprises a recess and/or opening 225*r*. Most preferably recess 225*r* facilitates the association of aligning arm 225 with optional prosthodontic members of variable dimensions and/or diameters.

Most preferably borehole 225*b* may be securely fastened and/or clamped over a prosthodontic implant member with a clamp locking member 225L for example as shown in FIG. 3G. Most preferably locking member 225L provides for opening and/or closing recess 225*r* over bore 225*b* by to allow for clamping and/or associating alignment arm 225 with an optional prosthodontic member. Directional arrow 225*m* shows the direction of movement of locking member 225*m* wherein as locking member is maneuvered toward recess 225*r* it functions to close recess 225*r*, while moving locking member away from recess 225*r* provides for opening recess 225*r*. Optionally movement of locking member 225L may be facilitated with a locking screw 225*s* for example as shown. Most preferably rotation of locking screw 225*s* in direction depicted by arrow 225*t* provides for maneuvering locking member 225L in the direction depicted by arrow 225*m*.

Optionally locking member 225L may be a clamp that is manually slid in the direction 225*m* to open or close recess 225*r*.

FIG. 3E shows an optional locking pin member 202, according to an optional embodiment, that may be associated with both bridge 210 (FIG. 3A) and alignment arm members 220, 222, 224, 226 (FIG. 3B-D) optionally and preferably to lock the relative position of alignment arm member 220 within recess 216 of bridge 210. Most preferably locking pin 202 may be introduced through bore 212 and through an optional recess that may be disposed about alignment arm members 220, for example 222*r*, 224*r*, 226*r* about an optional recess. Preferably locking pin 202 may be and locked into position with locking nut member 202*a*, over corresponding bore 212.

FIG. 4A-B show optional perspective views of parallel alignment tool assembly 200 and or kit, comprising bridge 210, FIG. 3A, alignment arm members 222, 224, 226 of FIG. 3B-D and optional locking pin 202 and locking nut member 202a, FIG. 3E. As shown, bridge 210 provides for receiving a plurality of alignment arm members 220 through central recess 216.

FIG. 4C-D shows a schematic illustration depicting the use of alignment tool assembly 200 within the oral cavity. FIG. 4D shows use of an optional bridge 210 comprising a solid continuous surface devoid of bores 212. FIG. 4C-D show optional alignment arm member 220 comprising an intermittent central recess 220r. FIG. 4C-D show alignment tool assembly 200 utilized to align a plurality of adjacent prosthodontic restoration member, shown in the form of an abutment assembly 10 comprising abutment pivot 12 showing its occlusal portion 12a, disposed within a sleeve 50, as shown in FIG. 4C. A plurality of alignment arm members 220 are associated with the prosthodontic restoration member, for example over sleeve 50 through its receiving bore 220r. As previously described receiving bore 220r may be of variable sizes so as to fit with the different sizes sleeves 50, for example a receiving bore having a large diameter 220L and receiving bore having a small diameter 220S, as shown.

FIG. 4D shows the plurality of extension 220 that are coupled with bridge member 210 through recess 216, where bridge 210 aligned relative to at least one or more adjacent teeth 56, as shown, therein the plurality of prosthodontic restoration members, in the form of abutment assembly 10, are placed on parallel planes with adjacent teeth 56. The width of extension 220 further provide for properly marginal spacing of between each abutment assembly 10 such that a restoration 5 (not shown) and the marginal spacing (marginal fit) with respect to adjacent teeth 56.

Figure 4E:
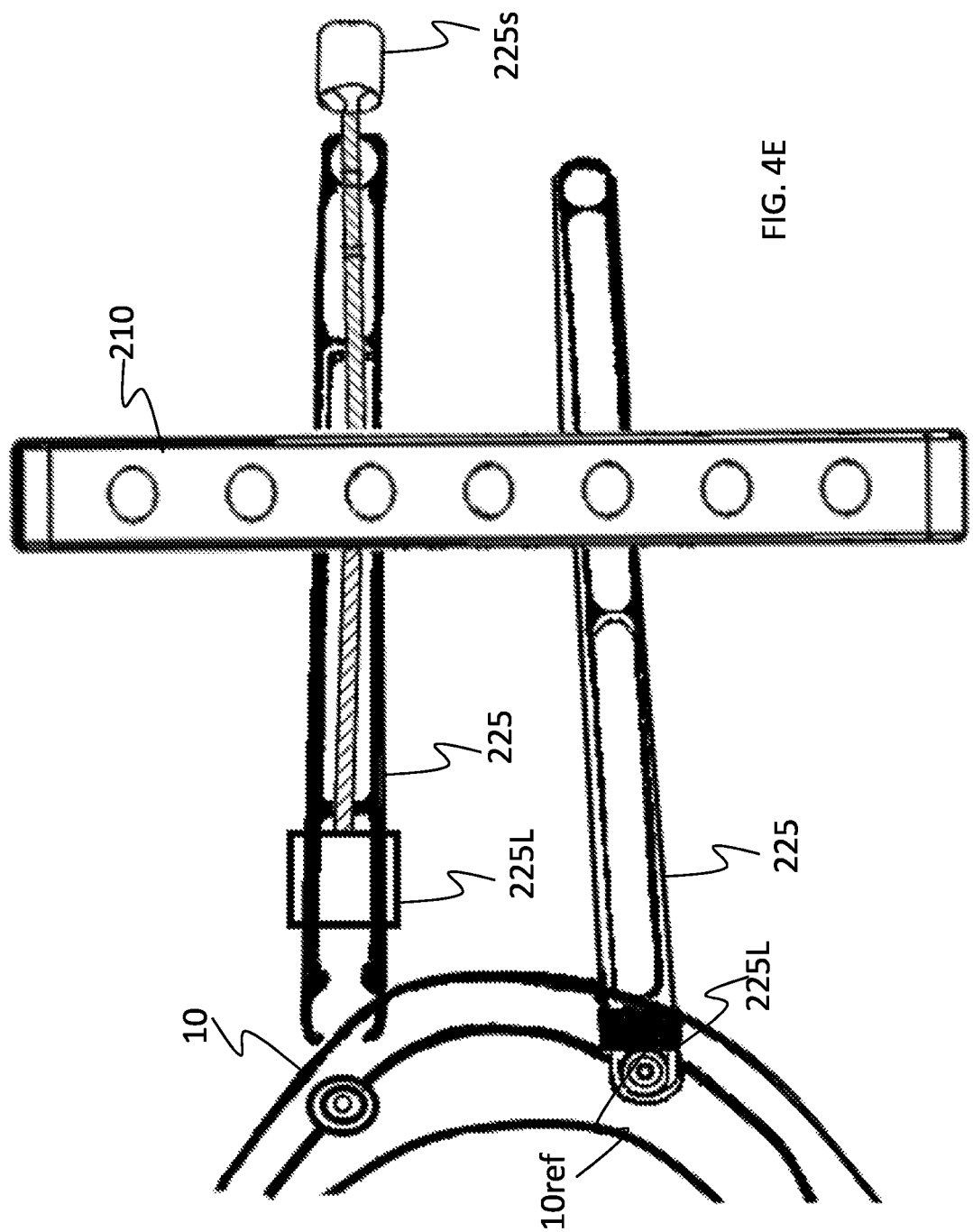
FIG. 4E show optional views of a schematic illustration of an assembly of the parallel alignment tool members depicted in FIG. 3F-G according to an optional embodiment of the present invention.

Once bridge member 210 is coupled over extensions 220 and aligned to assume parallel planes with respect to adjacent teeth 56, as shown, most preferably sleeve 50 is filled with a curable composite material, and allowed to cure such that abutment assembly 10 is fixed with the appropriate parallel orientation. Optionally and most preferably abutment 10 is fixed with locking nut 70 prior to allowing the composite material to fully cure. Most preferably locking nut 70 provides for centering abutment occlusal portion 12a within sleeve 50, therein further ensuring that the abutment occlusal portion is set and/or affixed in a parallel alignment. FIG. 4E provides a schematic illustration similar to that of FIG. 4A-D however utilizing the split borehole clamp alignment arm 225, depicted in FIG. 3F-G. Alignment arm 225 is associated with a reference abutment assembly 10 ref and is locked into position with clamp locking member 225L, as shown. A second clamp alignment arm 225 is utilized to associate with a second non-reference abutment assembly 10, while using bridge 210 to ensure that it is positioned in parallel position in relation to reference abutment assembly 10 ref.

FIG. 5A-6E show an optional embodiment of an alignment 200 shown in the form of a dual axes alignment tool 205. Dual axes alignment tool 205 functions for the same purpose and manner of alignment tool 200 however the alignment arm member and bridge member are integrated into a single tool 205, with the use of mediating member 230.

FIG. 5A-B show different views of alignment tool 205 in its assembled form, comprising bridge member 218, a plurality of alignment arm members 228 and a plurality of mediating members 230. FIG. 5A provides a perspective view while FIG. 5B provides a top-down view.

Optionally alignment tool 205 may utilize locking pin 202, as previously described, to lock a mediating member 230 and alignment arm member 228 into location about bridge member 218.

Most preferably alignment arm members 228 may be maneuvered and/or displaced about the length of bridge member 218 via mediating member 230 that is configured to slide along the length of bridge 218, therein defining a first alignment axis. Alignment arm members 228 may also be displaced about the width of bridge 218, therein defining a second alignment axis.

Optionally a locking pin 202 may be provided to lock alignment arm member 228 about at least one or both axes along said bridge 218. Optionally and preferably locking pin 202 may be and locked into position with locking nut member 202a.

FIG. 6A shows a more detailed depiction of dual axes bridge member 218, shown in the form of a substantially rectangular frame structure as described with respect to bridge 210. Bridge 218 comprises a central opening and or recess 218r defining a frame structure, provided for receiving at least a portion of alignment arm member 228.

The frame body of bridge 218 comprises two substantially parallel surfaces 218a,b about the length of bridge 218 that are coupled about two substantially parallel ends 218c,d. Most preferably ends 210c,d define the width of bridge 218 and recess 218r. Most preferably surface 218a,b define the length of bridge 218 and recess 218r.

Most preferably surfaces 218a,b defined a central recess forming a rail and/or track 218t along the length of bridge 218, as shown. Most preferably track 218t provides for facilitating sliding a mediating member 230 along the length of bridge 218.

Optionally each of parallel surfaces 218a,b may comprise at least one or more corresponding locking bores (not shown), that may provide for receiving a locking pin member 202 (FIG. 6E). Optionally locking bore may be variably spaced about the length of bridge 218 about surfaces 218a,b.

FIG. 6B-C show variable views of mediating member 230, shown in the form of a track guide. FIG. 6B provides a perspective view while FIG. 6C shows a face on view of track guide mediating member 230. Mediating member 230 is shown in the form of a track guide, comprising flanking arms 230a having rail and/or track 230t configuration corresponding to track 218t so as to allow mediating member 230 to slide and/or maneuvered about the length of bridge 218 along a track 218t, defining a first axis of tool 205.

FIG. 6C shows a face on view of mediating member 230 showing bore 230b provided for receiving at least a portion of extension 228, most preferably tail portion 228t. Most preferably bore 230b is aligned and corresponds with central recess 218r so as to allow movement of extension 228 through recess 218r and bore 230b about the width of bridge 218, therein defining a second axis of tool 205, for example as shown in FIG. 5B wherein the distance of head portion 228h from bridge 218 may be controlled to be close or far.

FIG. 6D shows a perspective view of alignment arm member 228 comprising a head portion 228h and a tail portion 228t. Most preferably tail portion 228t provides for associating alignment arm member 228 with mediating member 230 about bore 230b and bridge 218 about central recess 218r. Optionally tail portion 228t may be provided in optional lengths and sizes. Most preferably head portion 228h provides for associated extension 228 with a prosthodontic restoration member. Optionally head portion 228h may be provided in optional diameters and/or dimensions to provide for associated with optional prosthodontic restoration members. Most preferably head portion 228h comprises a central bore 228b for receiving and associated with at least a portion of prosthodontic restoration members.

Optionally tool 205 may be provided with a plurality of alignment arm member 228 having variable sizes about at least one or more of tail portion 228t, head portion 228h, or bore 228b.

FIG. 6F shows an optional an anchor alignment and orientation member 250.

Optionally orientation member 250 may provide for guiding the surgical placement of an implant anchor according the clinical situation in a pre-oriented position. Preferably orientation member 250 coupled with the alignment assembly comprising a bridge 210 and optional alignment arm, provide for placing an implant anchors within a jaw, in any position and/or in any pre-oriented position relative to an existing implant anchors and or adjacent teeth, most preferably within the limitations dictated by patient's individual morphology and/or the prosthodontics requirements.

As previously described assembly 200 comprising bridge 210 and optional alignment arms 220 may utilize optional locations about recess 220r, 220r, 222r, 224r, 226r, 228r and/or bore 220b, 220S, 220L, 222b, 224b, 226b, 228b as drill guides for drilling a borehole to facilitate the introducing and implant anchor into a jawbone.

Optionally orientation member 250 may be utilized by coupling with at least one of a bridge member 210 or an optional alignment arm 220, 222, 224, 225, 226, to provide a drill guide member that may be controllably oriented relative to the clinical and/or morphological disposition of the jawbone.

Most preferably orientation member 250 comprises a head portion 252, orientation controller 25 and a coupling member 256. Most preferably head portion 252 may assume any position, angle or direction in three dimensional space. Most preferably head portion 252 is provided in the form of a cylindrical tube and/or body having an open lumen to facilitate drilling there through, for example in the form of a drill guide.

Most preferably the orientation of head portion 252 is depicted and/or set with orientation controller 254. Optionally orientation controller 254 may be provided in the form of a ball and socket joint as is shown. Most preferably the position of orientation controller 254 may be locked into a specific position and/or orientation. Optionally, the three dimensional orientation setting of orientation controller 254 may be determined based on digital medical imagery of the jaw.

Optionally and preferably coupling member 256 facilitates coupling the orientation member 250 to with a bridge member 210 and/or an optional alignment arms 220, 222, 224, 225, 226. Optionally orientation member 250 may be coupled with a bridge member 210 over a borehole 212. Optionally member 250 may be coupled and/or otherwise associated with optional alignment arms 220, 222, 224, 225, 226, through borehole 220b, 222b, 224b, 225b, 226b or a recess 220r, 222r, 224r, 226r.

Figure 7:
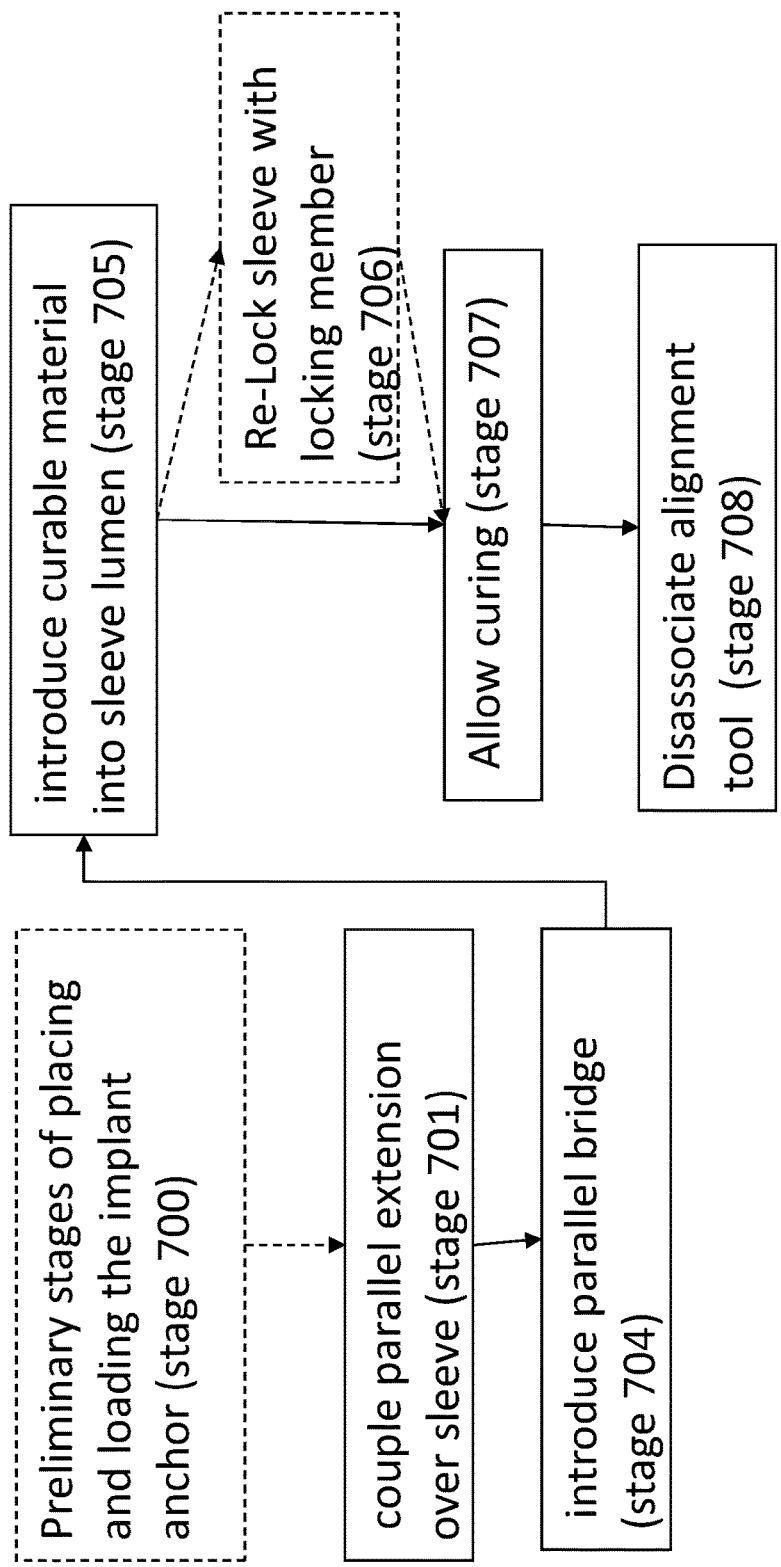
FIG. 7 shows a flowchart of a method for using the parallel alignment tool according to optional embodiments of the present invention.

FIG. 7 depicts a flowchart of an optional method for utilizing alignment tool 200,205 according to the present invention. Adjustment and/or activity prior to use of parallel alignment tool assembly 200,205, is collectively referred to as a single preliminary stage 700 to collectively refer to the stages for properly placing and/or loading the implant anchor with optional abutment assembly members 10, for example as described in the greater detail in the various stage of FIG. 8 prior to stage 1510b. Most preferably tool 200, 205 may be utilized at the final stages of placement of restoring by means of dental implant, most preferably to affix and/or set an abutment in a parallel position about other abutments and/or teeth.

Although the proceeding description reiterates use of alignment tool assembly 200,205 is provided with respect to a sleeve member 50, the use of tool 200,205 is not limited to use with a sleeve member and may be utilized with any prosthodontic restoration member for example including but not limited to a member of dental implant system 30, a member of abutment assembly 10, post, sleeve 50, 50s, 52, 54, over-denture abutments (for example including but not limited to ball attachments, snap attachments, telescopes), or the like.

Initially in stage 701, at least one or more alignment arm members 220, 222, 224, 226, 228 are coupled with at least one prosthodontic restoration member to be positioned. Most preferably alignment arm member receiving bore 220b, 222b, 224b, 226b, 228b, are associated with a sleeve member 50, for example as shown in FIG. 4C. Most preferably the size of receiving bore 220b, 222b, 224b, 226b, 228b is utilized relative to the size of sleeve member 50. Optionally if prosthodontic restoration assembly comprises a locking nut 70 (FIG. 4D), it may be associated with the abutment assembly 10 and/or post 12a, to ensure proper abutment stability and alignment within the sleeve member 50.

Next in stage 704 parallel bridge 210, 218 may be mounted and/or slid over alignment arm member 220 about central recess 216, 218r. As previously described alignment arm members 220 may be introduced into recess 216, 218r optionally by maneuvering or threading bridge 210,218 over alignment arm member 220 through recess 216. 218r. Optionally, according to an optional embodiment of the present invention, bridge 210 comprising an optional hinge member and bridge closing member 214 may be snapped and/or closed over extensions members 220 by assuming an open configuration of bridge 210 (open hinge) and then closing bridge 210 with closing member 214 over alignment arm member 220.

Next in stage 705 filling material (composite material) and/or curable material is introduced into the lumen of sleeve 50 in order to affix and/or set assembly members position. Optionally if abutment assembly 10 includes a locking nut 70 then it is removed from the assembly prior to filling sleeve 50 with the curable materials and then reintroduced over occlusal portion 12a so that occlusal portion 12a may be centered within sleeve 50 and set into the aligned parallel position. Next in stage 707 the curable composite material is allowed to cure, as is known in the art, to set the position of sleeve 50.

Finally in stage 708 once curing is complete, as is known in the art, alignment tool 200,205 and its components bridge member 210,218 and alignment arm members 220, 222, 224, 226, 228 are disassociated from sleeve 50 now in its securely and firmly affixed in final clinical required position.

Figure 8:
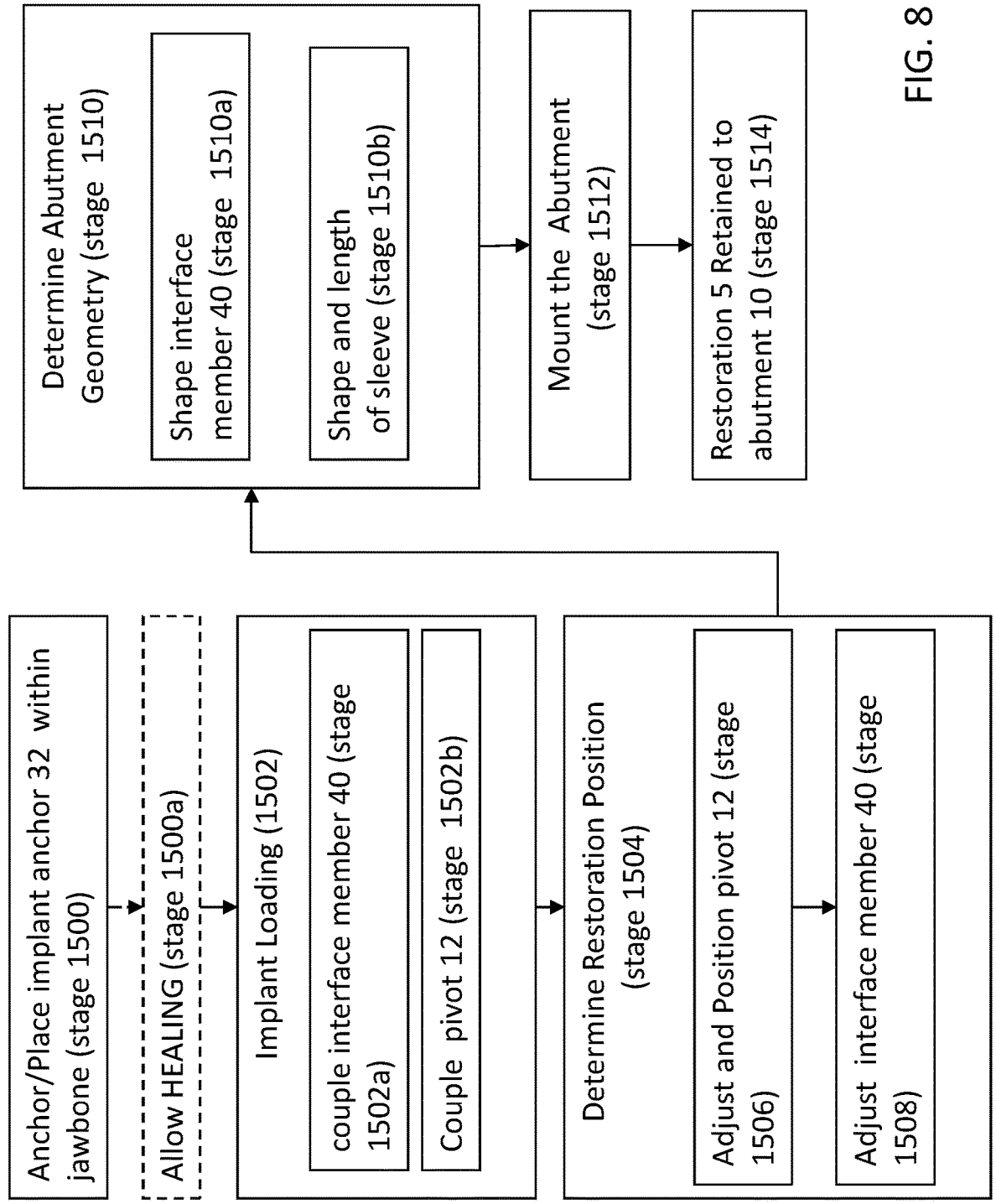
FIG. 8 shows a flowchart of a method for placing a dental implant system and optional use of tool according an optional embodiment of the present invention.

Now referring to FIG. 8 showing a flowchart depicting an optional methods for placing a dental implant system 30 comprising an abutment assembly 10 while utilizing tool 200 during the advanced stages of the implant restorative process for example as described in greater detail in FIG. 7.

First in stage 1500, the implant anchor 32 is placed within the jawbone according to methods as known in the art.

Optionally placement of the implant anchor may be followed with an optional and appropriate healing time, as depicted in stage 1500a. Optionally the placement of the implant anchor into the jaw bone may be guided with the help of tools such as 200, 205. Optionally locations about recess 220*r*, 220*r*, 222*r*, 224*r*, 226*r*, 228*r* and/or bore 220*b*, 220S, 220L, 222*b*, 224*b*, 226*b*, 228*b* may be utilized as guides for drilling a borehole for introducing and implant anchor into a jawbone.

Optionally tool 200,205 according to the present invention may be utilized to determine and/or depict where to place the implant anchor within the jaw bone.

Next in stage 1502 implant anchor 32 is loaded with an optional abutment assembly 10 according to the present invention. Implant's anchor loading comprises an initial sub-stage 1502*a* for coupling and/or otherwise associating an interface member 40, optionally and preferably comprising an elevated rim 47, with the implant anchor 32 most preferably about bore 36. Next in a secondary sub-stage 1502*b* abutment pivot 12 is coupled or otherwise associated with anchor 32, with pivot mounting member 16, for example utilizing optional threading 19, 68 or the like threading and/or coupling means. Most preferably abutment pivot 12 is placed through interface member 40 aperture 43 to allow for coupling while stabilizing portion 15 interfaces with internal surface 44 of interface member 40.

Next in stage 1504 the position of abutment assembly 10 is determined, particularly by evaluating the individual's morphology and related prosthodontic requirements to determine the end position of restoration 5 that is to be mounted on abutment assembly 10.

Next in stage 1506, a practitioner adjusts abutment assembly 10 about abutment pivot 12 about any of its portions for example about occlusal portion 12*a*, adjustment portion 14, or the like. Most preferably adjustment of abutment pivot 12 is provided in accordance with the position determined in stage 1504 therein accounting for and customizing and/or adjusting in accordance with the individual morphology and related prosthodontic requirements of the patient. Preferably, pivot 12 is positioned to protrude substantially perpendicularly to the occlusal plane, and align substantially parallel with abutments and/or teeth of the same jaw. Preferably pivot 12 may be positioned during the procedure by clinician and/or practitioner by adjusting its angle and direction in relation to at least one or more of pivot mounting member 16, the axis of anchor 32, other abutments and/or residual teeth. Preferably, the vertical dimension of abutment 10 assembly may be determined by occlusal reduction of pivot 12, for example by filing or cutting, Optionally vertical dimension of abutment 10 may be extended by extending pivot 12 as necessary, for example with pivot extender 12*e*, as previously described, to provide the necessary space about the occlusal plane for the structural durability of restoration 5. Optionally and preferably abutment 10 and in particular pivot 12 may be adjusted about occlusal portion 12*a* with off the shelf tools and/or dedicated and/or proprietary tools and/or pivot or abutment manipulators.

Once abutment pivot 12 is defined in accordance with individual morphology and related prosthodontic requirements to enable optimal positioning and vertical dimension of restoration 5, then interface member 40 is adjusted accordingly in stage 1508. Optionally stage 1506 and 1508 may be performed simultaneously and/or incrementally and/or interchangeably so as to ensure corresponding and/or correlated adjustment to pivot 12 and interface member 40.

In stage 1508 interface member 40 is adjusted to adapt between implant anchor 32, the perio-implant tissues, abutment assembly 10 and/or restoration's margins. Interface member 40 may be individually adjusted, optionally and preferably the adjustment is provided on line and/or in real time, during and/or while the procedure is carried out by the clinician and/or practitioner. Optionally and most preferably interface member 40 is adjusted about rim 47 of interface member 40, such that it is apically reduced by cutting and/or filing in relation to the gingiva, and is adjusted to most preferably be substantially perpendicular (at about a right angle and/or orthogonal) with respect to pivot 12. Therefore most preferably adjusting rim 47 defines and forms the contour of flange 46*a* therein forming and defining a smooth finish line. Optionally and preferably smoothing the finish line may be provided with standard tool and or dedicated tools. Most preferably a smooth finish line provides for properly engaging and closely fitting the apical end 50*a* of optional sleeves 50 or sleeve assembly 50*s* members including sleeves 52, 54, 52*b*, 54*b* and/or the apical surface and margins of restoration 5. Optionally the finish line may be defined by rim 53 as previously described.

Most preferably the finish line defined by flange 46, 46*a* or rim 53 will most preferably be substantially parallel to the occlusal plane, and substantially perpendicular to pivot 12. Preferably the finish line will be located in an area that may be inspected easily by a clinician, cleaned while providing sufficient distance from the alveolar crest to allow the combined epithelial and connective tissue attachment to generate a healthy "biologic width". The perpendicular positioning of abutment assembly 10 in relation to the occlusal plane, and the perpendicular positioning of sleeve 54 and/or restoration 5 in relation to the finish line about flange 46, 46*a*, rim 53, preferably enables for passive support and passive retention increasing resistance form. In addition to being perpendicular to occlusal plane and finish line, the parallel positioning of abutment assembly 10 and the parallel opposite walls of the sleeve determines one path of insertion and retrieval for restoration 5, providing passive support and retention for restoration 5.

Next in stage 1510 the geometry of abutment assembly 10 is determined by adjusting interface member 40 and sleeve 50 or members of sleeve assembly 50*s*. In sub-stage 1510*a* interface member 40 is adjusted further to finalize its geometry, shape and length. Most preferably the diameter of the transgingival portion (collar) 49 of interface member 40 may be adjusted. Optionally and preferably the diameter of transgingival portion (collar) 49 of interface 40 may be adjusted so as to be smaller than the diameter of implant anchor 32.

Most preferably adjusting interface member 40 about collar 49 defines a free space along the external anchor's platform providing for a free circular shoulder (also referred to as platform switching or platform shifting as a term of art). Most preferably such fee spaces (shoulder) about collar 49 allows a space onto which hard tissue may proliferate overlapping the implant's contour and improving its fixation and seal, preserving alveolar bone level and providing better support for the papillae. Optionally the reduced diameter of transgingival portion of interface member 40 at collar 49 restricts the contact surface between implant and perio-implant tissue, therein significantly improving the marginal seal of the implant. Most preferably the length of the transgingival portion defined between the alveolar ridge and finish line is optionally and preferably adjusted to ensure the integrity of the biologic width.

Next in stage 1510*b* following adjustment of the transgingival portion of interface member 40 as described in stage 1510*a*, sleeve 50 or sleeve assembly 50*s* members are similarly adjusted about at least one of the sleeve's end, occlusal end 50*b* and/or apical end 50*a*. Optionally both ends of sleeve 50 and/or sleeve assembly 50*s* members may be adjusted as necessary. More preferably, adjustments are made about the occlusal end 50*b* and optionally to the apical end 50*a*. Most preferably, the adjustments about sleeve 50 and/or assembly 50*s* may be provided so as to form an occlusal surface 50*b* that is substantially parallel with the finish line surface for example defined by flange 46, 46*a* or rim 53. The length of sleeve 50 may be determined by the distance between the finish line and the required gap about the occlusal plane. Most preferably the length of sleeve 50 is optimized to provide a larger surface area to ensure better retention between abutment assembly 10 members and restoration 5 via the intervening sleeve 50, 52. Most preferably while the length of sleeve 50 is optimized a required gap about the occlusal plane should be provided to ensure the structural durability of the restoration. Preferably the length of sleeve 50 may be adjusted about its occlusal extremity 50*b* to become substantially parallel with the finish line defined by flange 46, 46*a*, rim 53. Therein the surface of occlusal end 50*b* and flange 46*a*, are most preferably adjusted to form substantially parallel surfaces. Optionally the apical extremity 50*a* of sleeve 50 may also be adjusted to closely fit the finish line. Next in stage 1512 abutment assembly 10 may be mounted so as to prepare it to receive restoration 5. Most preferably abutment assembly 10 is mounted about pivot 12 that may be accomplished by optional means for example including but not limited to composite build up about pivot 12 or by coupling at least one or more sleeve 50,52 about pivot 12.

Optionally, a buildup about pivot 12 over occlusal portion 12*a* may be provided, as previously described, wherein filling materials, and/or composite materials may be shaped over pivot 12, for example about engageable portion 13. Optionally buildup about pivot 12 provides for molding and forming composite materials that may later be directly coupled with restoration 5 about bore 5*a*.

Optionally pivot 12 may be mounted with sleeve 50, 52, 52*b* or members of sleeve assembly 50*s*. Optionally the method of coupling sleeve 50 or sleeve assembly 50*s* about pivot 12 depends on the type of sleeve utilized. Optionally sleeve 50 or inner sleeve 52, 52*b* comprising inner threading 52*t* about the luminal surface, be threaded over pivot 12 to couple with engageable portion 13. Optionally sleeve 50 or inner sleeve 52, 52*b* may be mounted and/or coupled over pivot 12 with filling materials, composite materials or the like. Most preferably sleeve 50 or inner sleeve 52, 52*b* may be disposed over pivot 12 where the filling material is provided such that the inner lumen 50*c* is filled with filling materials and/or composite materials to allow the coupling of sleeve 50, 52 with pivot 12.

Preferably coupling sleeve 50, 52 provides for firmly engaging the inner surface 43 of interface member 40 and/or the inner contour of the finish line defined about flange 46, 46*a*. Most preferably, after coupling sleeve 50 onto pivot 12 the outer contour of the finish line defined by flange 46*a*, 46, rim 53 is left with substantial width to receive restoration 5 and/or additional sleeves, such that the finish line properly fits with restoration 5 both horizontally and vertically defining a proper emerging profile. Optionally and most preferably once sleeve 50 is introduced over pivot 12 and prior to filling sleeve 50 lumen with filling material alignment tool assembly 200,205 is utilized to ensure proper abutment assembly 10 positioning and parallel alignment as described in greater detail in FIG. 7.

Next stage 1514 restoration 5 is retained to abutment assembly 10. Most preferably restoration 5 may be coupled to abutment assembly 10 by optional means for example including but not limited to telescopic association, cementing, or rigid retainment or the like.

Optionally telescopic retainment may be provided when utilizing sleeve assembly 50*s* comprising inner sleeve 52, 52*b* and outer sleeve 54, 54*b*, where inner sleeve 52 is already coupled and/or associated with pivot 12, as described in stage 1512, now sleeve 54 is adjusted accordingly. First, the occlusal end 50*b* of outer sleeve 54 is adjusted such that it is slightly longer then sleeve 52. After length adjusted sleeve 54 is mounted over sleeve 52 so that sleeve 54 engages the finish line defined by flange 46*a*, 46, rim 53. Next restoration 5 is mounted over sleeve 54 and its profile adjusted about adjacent and opposite teeth and/or restorations until its apical margins passively engages the finish line. Restoration 5 is then passively cemented onto sleeve 54. Optionally and preferably once the adjustment to sleeve 54 is finalized sleeve 54 may be cast and/or integrated with restoration 5 about bore 5*a* and thereafter mounted onto sleeve 52, 52*b*. Most preferably, retention of restoration 5 about sleeve assembly 50*s* is achieved by the passive contact and friction fitting between the surfaces of sleeves 52 and 54, where sleeve 54 slides over sleeve 52 along the path of insertion and retrieval.

Optionally mounting restoration 5 by way of cementing is most preferably provided by cementing restoration 5 with sleeve 50, 52 that are coupled and/or otherwise associated over pivot 12 as described in stage 1512.

Optionally and preferably sleeve 50, 52 may acts as a mold for composite materials and may be removed once composite material hardens and/or cures, therein leaving the molded composite material built up over pivot 12. Next, restoration 5 is mounted over the composite built up and its profile is adjusted about adjacent and opposite teeth and/or restorations until the build up's apical margins passively engages the finish line defined about flange 46, 46*a*. Finally, restoration 5 is most preferably passively bonded and/or cemented to build up of abutment assembly 10.

A further optional method for retaining restoration 5 over abutment assembly 10 by way of cementing, may be provided by maintaining sleeve 50 intact, not removing it as described above, and directly cementing restoration 5 onto sleeve 50 over bore 5*a*. Optionally cementing restoration 5 via bore 5*a*, may be provided with a plurality of sleeves 50 bonded and/or fixed and/or otherwise coupled onto one another so as to provide a proper marginal fit between sleeve 50 and bore 5*a* of restoration 5.

A further optional method for retaining restoration 5 over abutment assembly 10 may be provided by way of rigid retainment. Preferably the occlusal extremities of abutment assembly 10 including sleeve 52 are adjusted such that sleeve 52 is reduced to lie slightly under the last occlusal threaded engageable portion 13 of pivot 12. Next locking nut 70 is threaded to engage engageable portion 13 of pivot 12. Optionally and preferably locking nut 70 may be threaded with pivot 12 through an aperture provided on the occlusal table of restoration 5. Most preferably locking nut 70 securely locks one or more of sleeve assembly member 50*s*, 52, 52*b*, 54, 54*b*, 50*r* and/or restoration 5 over pivot 12, most preferably over apical end 70*a*. Optionally and preferably locking nut 70 also provides for centering sleeve 52, sleeve assembly 50*s* with respect to the axis of pivot 12 via its external surface 70*c* comprising an appropriate profile, for example a stepped profile as shown, so as to fit the diameter of the sleeve being centered.

Optionally and most preferably once sleeve 52 is introduced over pivot 12 with locking nut 70 and prior to filling sleeve 50 lumen with filling material alignment tool assembly 200,205 is utilized to ensure proper abutment assembly 10 positioning and alignment, support and stability as described in greater detail in FIG. 7.

Restoration 5 may then be mounted over sleeve 52. Optionally the profile of restoration 5 may be adjusted relative to adjacent and opposite teeth and/or restorations until its apical margins passively engages the finish line for example defined by flange 46, 46a, or rim 53. Restoration 5 may then be passively cemented onto sleeve 52, and the aperture of restoration 5 may then be sealed optionally with a proper plug 72 and/or a filing as is known in dental art to complete the occlusal table of restoration 5.

Those skilled in the art to which the presently disclosed subject matter pertains will readily appreciate that numerous changes, variations, and modifications may be made without departing from the scope of the invention, mutatis mutandis.

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein. While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

Further modifications of the invention will also occur to persons skilled in the art and all such are deemed to fall within the spirit and scope of the invention as defined by the appended claims.

While the invention has been described with respect to a limited number of embodiments, it will be appreciated that many variations, modifications and other applications of the invention may be made.

What is clamed is:

1. A dental parallel alignment apparatus for aligning and positioning at least two or more dental implant abutments or dental implant abutment assemblies in substantially parallel alignment relative to one another to ensure alignment relative to residual teeth and/or other abutments on the same and opposite jaw, the apparatus comprising:
   a. at least two alignment arm members, each alignment arm member having a body including two opposing long sides and two opposing short ends, featuring an opening defined along the length and between said two opposing long sides and a receiving bore defined between said two opposing long sides adjacent to one of said two opposing short ends, said receiving bore provided for associating with said dental implant abutments or dental implant abutment assemblies, wherein said receiving bore communicating with the opening wherein said opening may be opened or closed so as to receive and clamp said at least two alignment arm members onto said dental implant abutment or dental implant abutment assembly; wherein when clamped the axis of said dental implant abutment or dental implant abutment assembly is normal to said two opposing long sides; and wherein said at least two alignment arm members feature a locking member moveable along the length of said two opposing long sides so as to open or close said opening formed with said receiving bore; and
   b. an alignment bridge having a three dimensional frame construct comprising two opposing surfaces and two opposing ends, said opposing surfaces defining a bridge central recess between said opposing surfaces, wherein said bridge central recess is adapted to receive said at least two alignment arm members therein providing for aligning said at least two alignment arm members with respect to each other by virtue of individually coupling each of said at least two alignment arm members to said alignment bridge; and wherein said opposing surfaces define the length of said bridge member.

2. The device of claim 1 wherein said opposing surfaces each comprise a plurality of bores, wherein said bores are axially aligned to be opposite one another across the bridge central recess.

3. The device of claim 2 further comprising a locking pin member wherein said corresponding bores provide for receiving said locking pin member.

4. The device of claim 3 further comprising a locking nut wherein said locking pin may be locked into position spanning said bridge central recess of bridge member over said corresponding bores.

5. The device of claim 1 wherein said bridge member assumes an open and closed configuration to open or close said bridge central recess to facilitate receiving and holding said at least two alignment arm members within said bridge central recess.

6. The apparatus of claim 1 wherein said at least two alignment arm members further comprise a plurality of bores along the length of said opposing long sides.

7. The apparatus of claim 6 wherein said plurality of bores have different diameters or shapes.

8. The apparatus of claim 1 wherein said locking member is configured to be displaced toward said opening of said receiving bore therein closing said opening of said receiving bore to lock at least one of said at least two alignment arm members.

9. The apparatus of claim 1 wherein said locking member is configured to be displaced away from said opening of said receiving bore therein opening said opening of said receiving bore.

10. The apparatus of claim 1 wherein said locking member is associated with a locking screw, said locking screw controls the position of said locking member along the length of at least one of said at least two alignment arm members to open or close said opening by adjusting said locking screw.

11. The apparatus of claim 1 wherein said body of said at least two alignment arm members have a rectangular body or a rounded rectangular body.

12. A kit for aligning and positioning at least two or more dental implant abutments or dental implant abutment assemblies in substantially parallel alignment relative to one another to ensure alignment relative to residual teeth and/or other abutments on the same and opposite jaw, the kit comprising:
   a. a plurality of alignment arm members, wherein each alignment arm member having a body including two opposing long sides and two opposing short ends and including a receiving bore adjacent to one of said two opposing short ends, said receiving bore provided for associating with said dental implant abutments or dental implant abutment assemblies, wherein said receiving bore comprising an opening such that said opening may be opened or closed so as to receive and clamp said alignment arm member onto said dental implant abutment or dental implant abutment assembly; wherein said alignment arm member features a locking clamp member that is configured to be displaced along the length of said two opposing long sides to open or close the opening formed with said receiving bore;
   b. at least one alignment bridge having a three dimensional frame construct comprising two opposing surfaces and two opposing ends, said two opposing surfaces defining a bridge central recess adapted to receive said plurality of alignment arm members therein providing for aligning said plurality of alignment arm members with respect to each other, said opposing surfaces defining the length of said bridge member, wherein each comprises a plurality of corresponding bores that are aligned opposite one another across each of said opposing surfaces;
   c. a plurality of locking pin members, each locking pin member configured to be received across a pair of said corresponding bores of said alignment bridge wherein said locking pin members are provided for locking the position of an aligning arm within said central recess.

13. The kit of claim 12 wherein the position of said locking clamp member is functionally coupled to a locking screw to control the position of said locking clamp along the length of said alignment arm member.

14. A dental parallel alignment apparatus for aligning and positioning at least two or more dental implant abutments or dental implant abutment assemblies in substantially parallel alignment relative to one another to ensure alignment relative to residual teeth and/or other abutments on the same and opposite jaw, the apparatus comprising:
   a. at least two alignment arm members, each alignment arm member having a body including two opposing long sides and two opposing short ends, featuring an opening along the length and between said two opposing long sides and a receiving bore defined between said two opposing long sides adjacent to one of said two opposing short ends, said receiving bore provided for associating with said dental implant abutments or dental implant abutment assemblies, wherein said receiving bore communicating with the opening wherein said opening may be opened or closed so as to receive and clamp said alignment arm member onto said dental implant abutment or dental implant abutment assembly; wherein when clamped the axis of said dental implant abutment or dental implant abutment assembly is normal to said two opposing long sides; and wherein said alignment arm member feature a locking member moveable along the length of said two opposing long sides so as to open or close said opening formed with said receiving bore; and
   b. an alignment bridge, having a three dimensional frame construct comprising two opposing surfaces and two opposing ends, said opposing surfaces defining a bridge central recess between said opposing surfaces, wherein said bridge central recess is adapted to receive said at least two alignment arm members therein providing for aligning said at least two alignment arm members with respect to each other; and wherein said opposing surfaces define the length of said bridge member, wherein said two opposing surfaces of said alignment bridge comprise a plurality of corresponding bores wherein said corresponding bores are aligned opposite one another across said two opposing surfaces of said alignment bridge;
   c. at least one locking pin member provided for placement through said corresponding bores.

* * * * *